US008593510B2

(12) United States Patent
Yoo et al.

(10) Patent No.: US 8,593,510 B2
(45) Date of Patent: Nov. 26, 2013

(54) IMAGE DISPLAY APPARATUS AND OPERATING METHOD THEREOF

(75) Inventors: Kyung Hee Yoo, Seoul (KR); Sang Jun Koo, Seoul (KR); Sae Hun Jang, Seoul (KR); Uni Young Kim, Seoul (KR); Hyung Nam Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 423 days.

(21) Appl. No.: 12/905,814

(22) Filed: Oct. 15, 2010

(65) Prior Publication Data

US 2011/0115887 A1 May 19, 2011

(30) Foreign Application Priority Data

Nov. 13, 2009 (KR) .................. 10-2009-0109431

(51) Int. Cl.
*H04N 13/04* (2006.01)
(52) U.S. Cl.
USPC .......................................................... 348/51
(58) Field of Classification Search
None
See application file for complete search history.

(56) References Cited

U.S. PATENT DOCUMENTS

| 6,181,343 | B1* | 1/2001 | Lyons ............................ 715/850 |
| 6,571,193 | B1* | 5/2003 | Unuma et al. ................. 702/141 |
| 2002/0086728 | A1* | 7/2002 | Bennett et al. .................. 463/25 |
| 2003/0179294 | A1* | 9/2003 | Martins .......................... 348/157 |
| 2004/0190776 | A1* | 9/2004 | Higaki et al. .................. 382/190 |
| 2006/0188144 | A1* | 8/2006 | Sasaki et al. .................. 382/154 |
| 2007/0075968 | A1* | 4/2007 | Hall et al. ...................... 345/157 |
| 2007/0152984 | A1* | 7/2007 | Ording et al. .................. 345/173 |
| 2008/0018595 | A1* | 1/2008 | Hildreth et al. ............... 345/156 |
| 2008/0186255 | A1* | 8/2008 | Cohen et al. ........................ 345/8 |
| 2008/0192005 | A1* | 8/2008 | Elgoyhen et al. ............. 345/158 |
| 2008/0231609 | A1 | 9/2008 | Dehlin et al. |
| 2008/0231926 | A1 | 9/2008 | Klug et al. |
| 2009/0237492 | A1 | 9/2009 | Kikinis et al. |

* cited by examiner

*Primary Examiner* — Joseph Ustaris
*Assistant Examiner* — Zhubing Ren
(74) *Attorney, Agent, or Firm* — Birch, Stewart, Kolasch & Birch, LLP

(57) ABSTRACT

An image display apparatus and an operating method thereof are provided. The image display apparatus may determine the location of a user, and may display a 3D object in consideration of the location of the user. If the user moves his or her eyes or hands, the location of the 3D object may change accordingly.

16 Claims, 17 Drawing Sheets

170

(a)

170

(b)

(a)

(b)

(c)

(d)

(e)

(a)

(b)

(c)

IMAGE DISPLAY APPARATUS AND OPERATING METHOD THEREOF

CROSS-REFERENCE TO RELATED APPLICATION

This application claims the priority to Korean Patent Application No. 10-2009-0109431, filed Nov. 13, 2009 in the Korean Intellectual Property Office, the disclosure of which is incorporated herein by reference.

BACKGROUND OF THE INVENTION

1. Field of the Invention

The present invention relates to an image display apparatus and an operating method thereof, and more particularly, to an image display apparatus, that is capable of displaying a screen to which a stereoscopic effect is applied and thus providing a sense of three-dimensionality, and an operating method of the image display apparatus.

2. Description of the Related Art

Image display devices display various video data viewable to users. In addition, image display devices allow users to select some broadcast video signals from all the broadcast video signals transmitted by a broadcasting station, and then display the selected broadcast video signals. Worldwide, the broadcasting industry is in the process of converting from analog to digital broadcasting.

Digital broadcasting is characterized by transmitting digital video and audio signals. Digital broadcasting can offer various advantages over analog broadcasting such as robustness against noise, no or little data loss, the ease of error correction and the provision of high-resolution, high-definition screens. The commencement of digital broadcasting has enabled the provision of various interactive services.

Image display apparatuses can display 2-dimensional (2D) or 3-dimensional (3D) images. In general, a 3D image may be created by combining a left-eye image and a right-eye image so as to create a sense of three-dimensionality. Then, a viewer may view the left-eye image and the right-eye image from the 3D image with his or her left and right eyes, respectively, by wearing polarized glasses. However, it is possible to create the illusion of depth and distance, even in a 2D image that is not created by combining a left-eye image and a right-eye image, by applying a stereoscopic effect to the 2D image.

SUMMARY OF THE INVENTION

The present invention provides an image display apparatus capable of displaying a screen to which a stereoscopic effect is applied so as to provide a sense of three-dimensionality and an operating method of the image display apparatus.

The present invention also provides a user interface (UI) that can be applied to an image display apparatus capable of displaying a screen to which a stereoscopic effect is applied so as to provide a sense of three-dimensionality and can thus improve user convenience.

According to an aspect of the present invention, there is provided an operating method of an image display apparatus capable of displaying a three-dimensional (3D) object, the operating method including receiving a first signal for determining the location of a reference point; determining the location of the reference point based on the signal; generating a 3D object by processing a 3D object image signal in consideration of the location of the reference point; and displaying the 3D object so as to correspond to the reference point.

According to another aspect of the present invention, there is provided an image display apparatus capable of displaying a 3D object, the image display apparatus including a control unit that receives a first signal for determining the location of a reference point, determines the location of the reference point based on the signal, and generates a 3D object by processing a 3D object image signal in consideration of the location of the reference point; and a display unit that displays the 3D object so as to correspond to the reference point.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

The embodiments of the present invention will hereinafter be described in detail with reference to the accompanying drawings in which exemplary embodiments of the invention are shown. In this disclosure, the terms 'module' and 'unit' can be used interchangeably.

Figure 1:
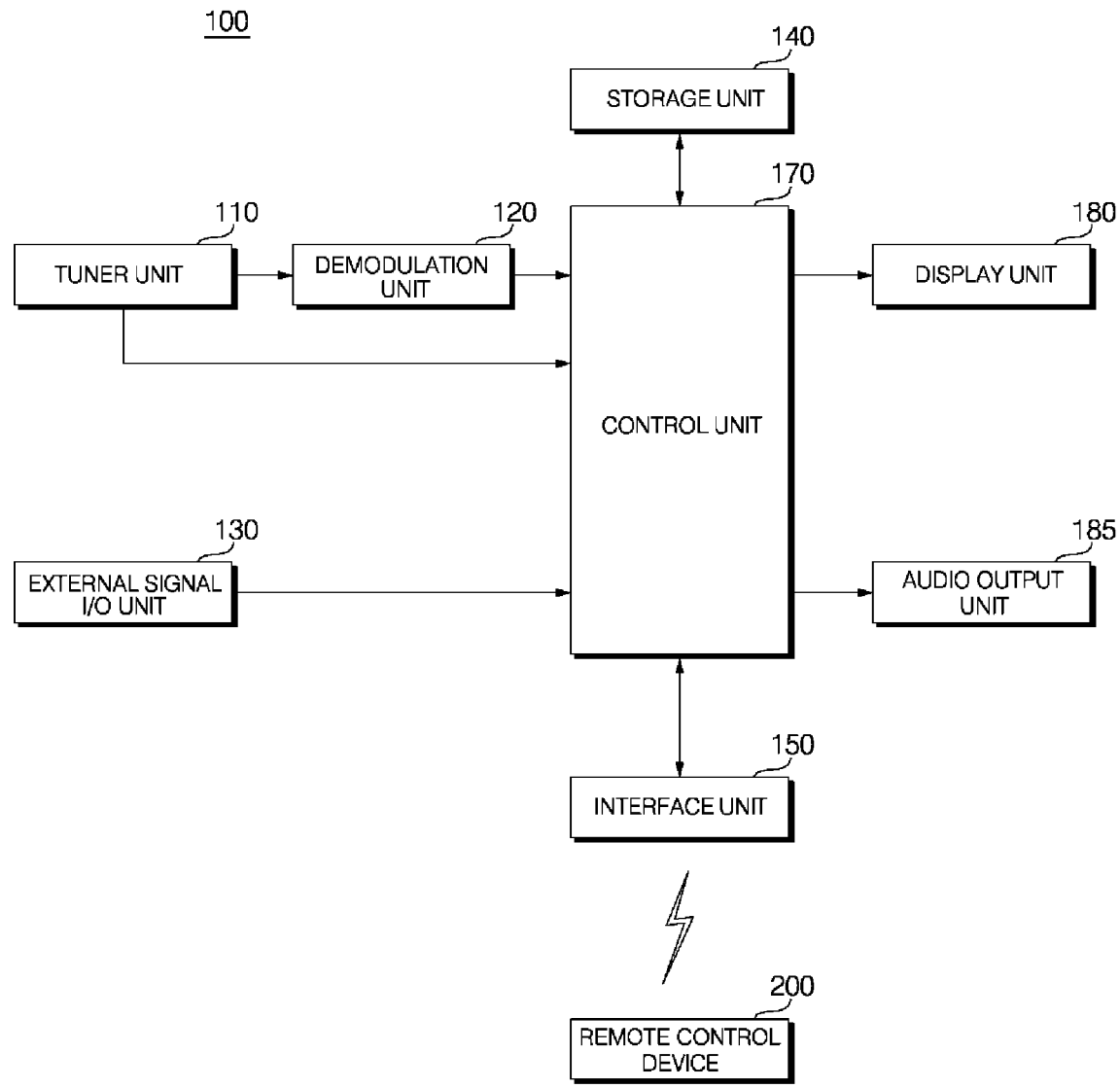
FIG. 1 illustrates a block diagram of an image display apparatus according to an exemplary embodiment of the present invention.

FIG. 1 illustrates a block diagram of an image display apparatus 100 according to an exemplary embodiment of the present invention. Referring to FIG. 1, the image display apparatus 100 may include a tuner unit 110, a demodulation unit 120, an external signal input/output (I/O) unit 130, a storage unit 140, an interface 150, a sensing unit (not shown), a control unit 170, a display unit 180, and an audio output unit 185.

The tuner unit 110 may select a radio frequency (RF) broadcast signal corresponding to a channel selected by a user or an RF broadcast signal corresponding to a previously-stored channel from a plurality of RF broadcast signals received via an antenna and may convert the selected RF broadcast signal into an intermediate-frequency (IF) signal or a baseband audio/video (A/V) signal. More specifically, if the selected RF broadcast signal is a digital broadcast signal, the tuner unit 110 may convert the selected RF broadcast signal into a digital IF signal DIF. On the other hand, if the selected RF broadcast signal is an analog broadcast signal, the tuner unit 110 may convert the selected RF broadcast signal into an analog baseband A/V signal composite video baseband signal/sound intermediate frequency (CVBS/SIF.) That is, the tuner unit 110 can process both digital broadcast signals and analog broadcast signals. The analog baseband A/V signal CVBS/SIF may be directly transmitted to the control unit 170.

The tuner unit 110 may be able to receive RF broadcast signals from an Advanced Television Systems Committee (ATSC) single-carrier system or from a Digital Video Broadcasting (DVB) multi-carrier system.

The tuner unit 110 may sequentially select a number of RF broadcast signals respectively corresponding to a number of channels previously added to the image display apparatus 100 by a channel-add function from a plurality of RF signals received through the antenna, and may convert the selected RF broadcast signals into IF signals or baseband A/V signals in order to display a thumbnail list including a plurality of thumbnail images on the display unit 180. Thus, the tuner unit 110 can receive RF broadcast signals sequentially or periodically not only from the selected channel but also from a previously-stored channel.

The demodulation unit 120 may receive the digital IF signal DIF from the tuner unit 110 and may demodulate the digital IF signal DIF.

More specifically, if the digital IF signal DIF is, for example, an ATSC signal, the demodulation unit 120 may perform 8-Vestigal SideBand (VSB) demodulation on the digital IF signal DIF. The demodulation unit 120 may perform channel decoding. For this, the demodulation unit 120 may include a Trellis decoder, a de-interleaver and a Reed-Solomon decoder and may thus be able to perform Trellis decoding, de-interleaving and Reed-Solomon decoding.

On the other hand, if the digital IF signal DIF is, for example, a DVB signal, the demodulation unit 120 may perform coded orthogonal frequency division modulation (COFDMA) demodulation on the digital IF signal DIF. The demodulation unit 120 may perform channel decoding. For this, the demodulation unit 120 may include a convolution decoder, a de-interleaver, and a Reed-Solomon decoder and may thus be able to perform convolution decoding, de-interleaving and Reed-Solomon decoding.

The demodulation unit 120 may perform demodulation and channel decoding on the digital IF signal DIF, thereby providing a stream signal TS into which a video signal, an audio signal and/or a data signal are multiplexed. The stream signal TS may be an MPEG-2 transport stream into which an MPEG-2 (Moving Picture Expert Group) video signal and a Dolby AC-3 (Arc Consistency Algorithm #3) audio signal are multiplexed. An MPEG-2 transport stream may include a 4-byte header and a 184-byte payload.

The demodulation unit 120 may include an ATSC demodulator for demodulating an ATSC signal and a DVB demodulator for demodulating a DVB signal.

The stream signal TS may be transmitted to the control unit 170. The control unit 170 may perform demultiplexing and signal processing on the stream signal TS, thereby outputting video data and audio data to the display unit 180 and the audio output unit 185, respectively.

The external signal I/O unit 130 may connect the image display apparatus 100 to an external device. For this, the external signal I/O unit 130 may include an A/V I/O module or a wireless communication module.

The external signal I/O unit 130 may be connected to an external device such as a digital versatile disc (DVD), a Blu-ray disc, a gaming device, a camera, a camcorder, or a computer (e.g., a laptop computer) either via a wired connection or wirelessly. Then, the external signal I/O unit 130 may receive various video, audio and data signals from the external device and may transmit the received signals to the control unit 170. In addition, the external signal I/O unit 130 may output various video, audio and data signals processed by the control unit 170 to the external device.

In order to transmit A/V signals from an external device to the image display apparatus 100, the A/V I/O module of the external signal I/O unit 130 may include an Ethernet port, a universal serial bus (USB) port, a composite video banking sync (CVBS) port, a component port, a super-video (S-video) (analog) port, a digital visual interface (DVI) port, a high-definition multimedia interface (HDMI) port, a red-green-blue (RGB) port, and a D-sub port.

The wireless communication module of the external signal I/O unit 130 may wirelessly access the internet, i.e., may allow the image display apparatus 100 to access a wireless internet connection. For this, the wireless communication module may use various communication standards such as a wireless local area network (WLAN) (i.e., Wi-Fi), Wireless broadband (Wibro), World Interoperability for Microwave Access (Wimax), or High Speed Downlink Packet Access (HSDPA).

In addition, the wireless communication module may perform short-range wireless communication with other electronic devices. The image display apparatus 100 may be networked with other electronic devices using various communication standards such as Bluetooth, radio-frequency identification (RFID), Infrared Data Association (IrDA), Ultra Wideband (UWB), or ZigBee.

The external signal I/O unit 130 may be connected to various set-top boxes through at least one of the Ethernet port, the USB port, the CVBS port, the component port, the S-video port, the DVI port, the HDMI port, the RGB port, the D-sub port, the IEEE-1394 port, the S/PDIF port, and the liquidHD port and may thus receive data from or transmit data to the various set-top boxes. For example, when connected to an Internet Protocol Television (IPTV) set-top box, the external signal I/O unit 130 may transmit video, audio and data signals processed by the IPTV set-top box to the control unit 170 and may transmit various signals provided the control unit 170 to the IPTV set-top box. In addition, video, audio and data signals processed by the IPTV set-top box may be processed by the channel-browsing processor 170 and then the control unit 170.

The term 'IPTV', as used herein, may cover a broad range of services such as ADSL-TV, VDSL-TV, FTTH-TV, TV over DSL, Video over DSL, TV over IP (TVIP), Broadband TV (BTV), and Internet TV and full-browsing TV, that are capable of providing Internet-access services.

The external signal I/O unit 130 may be connected to a communication network so as to be provided with a video or voice call service. Examples of the communication network include a broadcast communication network (such as a local area network (LAN)), a public switched telephone network (PTSN), and a mobile communication network.

The storage unit 140 may store various programs necessary for the control unit 170 to process and control signals. The storage unit 140 may also store video, audio and/or data signals processed by the control unit 170.

The storage unit 140 may temporarily store video, audio and/or data signals received by the external signal I/O unit 130. In addition, the storage unit 140 may store information regarding a broadcast channel with the aid of a channel add function.

The storage unit 140 may include at least one of a flash memory-type storage medium, a hard disc-type storage medium, a multimedia card micro-type storage medium, a card-type memory (such as a secure digital (SD) or extreme digital (XD) memory), a random access memory (RAM), and a read-only memory (ROM) (such as an electrically erasable programmable ROM (EEPROM)). The image display apparatus 100 may play various files (such as a moving image file, a still image file, a music file or a document file) in the storage unit 140 for a user.

The storage unit 140 is illustrated in FIG. 1 as being separate from the control unit 170, but the present invention is not restricted to this. That is, the storage unit 140 may be included in the control unit 170.

The interface 150 may transmit a signal input thereto by a user to the control unit 170 or transmit a signal provided by the control unit 170 to a user. For example, the interface 150 may receive various user input signals such as a power-on/off signal, a channel-selection signal, and a channel-setting signal from a remote control device 200 or may transmit a signal provided by the control unit 170 to the remote control device 200. The sensing unit may allow a user to input various user commands to the image display apparatus 100 without the need to use the remote control device 200. The structure of the sensing unit will be described later in further detail.

The control unit 170 may demultiplex an input stream provided thereto via the tuner unit 110 and the demodulation unit 120 or via the external signal I/O unit 130 a number of signals and may process the signals obtained by the demultiplexing in order to output A/V data. The control unit 170 may control the general operation of the image display apparatus 100.

The control unit 170 may control the image display apparatus 100 in accordance with a user command input thereto via the interface unit 150 or the sensing unit or a program present in the image display apparatus 100.

The control unit 170 may include a demultiplexer (not shown), a video processor (not shown) and an audio processor (not shown). The control unit 170 may control the tuner unit 110 to tune to select an RF broadcast program corresponding to a channel selected by a user or a previously-stored channel.

The control unit 170 may demultiplex an input stream signal, e.g., an MPEG-2 TS signal, into a video signal, an audio signal and a data signal. The input stream signal may be a stream signal output by the tuner unit 110, the demodulation unit 120 or the external signal I/O unit 130. The control unit 170 may process the video signal. More specifically, the control unit 170 may decode the video signal using different codecs according to whether the video signal includes a 2D image signal and a 3D image signal, includes a 2D image signal only or includes a 3D image signal only. It will be described later in further detail how the control unit 170 processes a 2D image signal or a 3D image signal with reference to FIG. 3. The control unit 170 may adjust the brightness, tint and color of the video signal.

The processed video signal provided by the control unit 170 may be transmitted to the display unit 180 and may thus be displayed by the display unit 180. Then, the display unit 180 may display an image corresponding to the processed video signal provided by the control unit 170. The processed video signal provided by the control unit 170 may also be transmitted to an external output device via the external signal I/O unit 130.

The control unit 170 may process the audio signal obtained by demultiplexing the input stream signal. For example, if the audio signal is an encoded signal, the control unit 170 may decode the audio signal. More specifically, if the audio signal is an MPEG-2 encoded signal, the control unit 170 may decode the audio signal by performing MPEG-2 decoding. On the other hand, if the audio signal is an MPEG-4 Bit Sliced Arithmetic Coding (BSAC)-encoded terrestrial DMB signal, the control unit 170 may decode the audio signal by performing MPEG-4 decoding. On the other hand, if the audio signal is an MPEG-2 Advanced Audio Coding (AAC)-encoded DMB or DVB-H signal, the controller 180 may decode the audio signal by performing AAC decoding. In addition, the control unit 170 may adjust the base, treble or sound volume of the audio signal.

The processed audio signal provided by the control unit 170 may be transmitted to the audio output unit 185. The processed audio signal provided by the control unit 170 may also be transmitted to an external output device via the external signal I/O unit 130.

The control unit 170 may process the data signal obtained by demultiplexing the input stream signal. For example, if the data signal is an encoded signal such as an electronic program guide (EPG) to scheduled broadcast TV or radio programs, the control unit 170 may decode the data signal. Examples of an EPG include ATSC-Program and System Information Protocol (PSIP) information and DVB-Service Information (SI). ATSC-PSIP information or DVB-SI information may be included in the header of a TS, i.e., a 4-byte header of an MPEG-2 TS.

The control unit 170 may perform on-screen display (OSD) processing. More specifically, the control unit 170 may generate an OSD signal for displaying various information on the display device 180 as graphic or text data based on a user input signal provided by the remote control device 200 or at least one of a processed video signal and a processed data signal. The OSD signal may be transmitted to the display unit 180 along with the processed video signal and the processed data signal.

The OSD signal may include various data such as a user-interface (UI) screen for the image display apparatus 100 and various menu screens, widgets, and icons.

The control unit 170 may generate the OSD signal as a 2D image signal or a 3D image signal, and this will be described later in further detail with reference to FIG. 3.

The control unit 170 may receive the analog baseband A/V signal CVBS/SIF from the tuner unit 110 or the external signal I/O unit 130. An analog baseband video signal processed by the control unit 170 may be transmitted to the display unit 180, and may then be displayed by the display unit 180. On the other hand, an analog baseband audio signal processed by the control unit 170 may be transmitted to the audio output unit 185 (e.g., a speaker) and may then be output through the audio output unit 185.

The image display apparatus 100 may also include a channel-browsing processing unit (not shown) that generates a thumbnail image corresponding to a channel signal or an externally-input signal. The channel-browsing processing unit may receive the stream signal TS from the demodulation unit 120 or the external signal I/O unit 130, may extract an image from the stream signal TS, and may generate a thumbnail image based on the extracted image. The thumbnail image generated by the channel-browsing processing unit may be transmitted to the control unit 170 as it is without being encoded. Alternatively, the thumbnail image generated by the channel-browsing processing unit may be encoded, and the encoded thumbnail image may be transmitted to the control unit 170. The control unit 170 may display a thumbnail list including a number of thumbnail images input thereto on the display unit 180.

The control unit 170 may receive a signal from the remote control device 200 via the interface unit 150. Thereafter, the control unit 170 may identify a command input to the remote control device 200 by a user based on the received signal, and may control the image display apparatus 100 in accordance with the identified command. For example, if a user inputs a command to select a predetermined channel, the control unit 170 may control the tuner unit 110 to receive a video signal, an audio signal and/or a data signal from the predetermined channel, and may process the signal(s) received by the tuner unit 110. Thereafter, the control unit 170 may control channel information regarding the predetermined channel to be output through the display unit 180 or the audio output unit 185 along with the processed signal(s).

A user may input may input a command to display various types of A/V signals to the image display apparatus 100. If a user wishes to watch a camera or camcorder image signal received by the external signal I/O unit 130, instead of a broadcast signal, the control unit 170 may control a video signal or an audio signal to be output via the display unit 180 or the audio output unit 185.

The control unit 170 may identify a user command input to the image display apparatus 100 via a number of local keys that is included in the sensing unit, and may control the image display apparatus 100 in accordance with the identified user command. For example, a user may input various commands such as a command to turn on or off the image display apparatus 100, a command to switch channels, or a command to change volume to the image display apparatus 100 using the local keys. The local keys may include buttons or keys provided at the image display apparatus 100. The control unit 170 may determine how the local keys have been manipulated by a user, and may control the image display apparatus 100 according to the results of the determination.

The display unit 180 may convert a processed video signal, a processed data signal, and an OSD signal provided by the control unit 170 or a video signal and a data signal provided by the external signal I/O unit 130 into RGB signals, thereby generating driving signals. The display unit 180 may be implemented into various types of displays such as a plasma display panel, a liquid crystal display (LCD), an organic light-emitting diode (OLED), a flexible display, and a three-dimensional (3D) display. The display unit 180 may be classified into an additional display or an independent display. The independent display is a display device capable of displaying a 3D image without a requirement of additional display equipment such as glasses. Examples of the independent display include a lenticular display and parallax barrier display. On the other hand, the additional display is a display device capable of displaying a 3D image with the aid of additional display equipment. Examples of the additional display include a head mounted display (HMD) and an eyewear display (such as a polarized glass-type display, a shutter glass display, or a spectrum filter-type display).

The display unit 180 may also be implemented as a touch screen and may thus be used not only as an output device but also as an input device.

The audio output unit 185 may receive a processed audio signal (e.g., a stereo signal, a 3.1-channel signal or a 5.1-channel signal) from the control unit 170 and may output the received audio signal. The audio output unit 185 may be implemented into various types of speakers.

The remote control device 200 may transmit a user input to the interface 150. For this, the remote control device 200 may use various communication techniques such as Bluetooth, RF, IR, UWB and ZigBee.

The remote control device 100 may receive a video signal, an audio signal or a data signal from the interface unit 150, and may output the received signal.

The image display apparatus 100 may also include the sensor unit. The sensor unit may include a touch sensor, an acoustic sensor, a position sensor, and a motion sensor.

The touch sensor may be a touch screen of the display unit 180. The touch sensor may sense where on the touch screen and with what intensity a user is touching. The acoustic sensor may sense the voice of a user various sounds generated by a user. The position sensor may sense the position of a user. The motion sensor may sense a gesture generated by a user. The position sensor or the motion sensor may include an infrared detection sensor or camera, and may sense the distance between the image display apparatus 100 and a user, and any hand gestures made by the user.

The sensor unit may transmit various sensing results provided by the touch sensor, the acoustic sensor, the position sensor and the motion sensor to a sensing signal processing unit (not shown). Alternatively, the sensor unit may analyze the various sensing results, and may generate a sensing signal based on the results of the analysis. Thereafter, the sensor unit may provide the sensing signal to the control unit 170.

The sensing signal processing unit may process the sensing signal provided by the sensing unit, and may transmit the processed sensing signal to the control unit 170.

The image display apparatus 100 may be a fixed digital broadcast receiver capable of receiving at least one of ATSC (8-VSB) broadcast programs, DVB-T (COFDM) broadcast programs, and ISDB-T (BST-OFDM) broadcast programs or may be a mobile digital broadcast receiver capable of receiving at least one of terrestrial DMB broadcast programs, satellite DMB broadcast programs, ATSC-M/H broadcast programs, DVB-H (COFDM) broadcast programs, and Media Forward Link Only (MediaFLO) broadcast programs. Alternatively, the image display apparatus 100 may be a digital broadcast receiver capable of receiving cable broadcast programs, satellite broadcast programs or IPTV programs.

Examples of the image display apparatus 100 include a TV receiver, a mobile phone, a smart phone, a laptop computer, a digital broadcast receiver, a personal digital assistant (PDA) and a portable multimedia player (PMP).

The structure of the image display apparatus 100 shown in FIG. 1 is exemplary. The elements of the image display apparatus 100 may be incorporated into fewer modules, new elements may be added to the image display apparatus 100 or some of the elements of the image display apparatus 100 may not be provided. That is, two or more of the elements of the image display apparatus 100 may be incorporated into a single module, or some of the elements of the image display apparatus 100 may each be divided into two or more smaller units. The functions of the elements of the image display apparatus 100 are also exemplary, and thus do not put any restrictions on the scope of the present invention.

Figure 2:
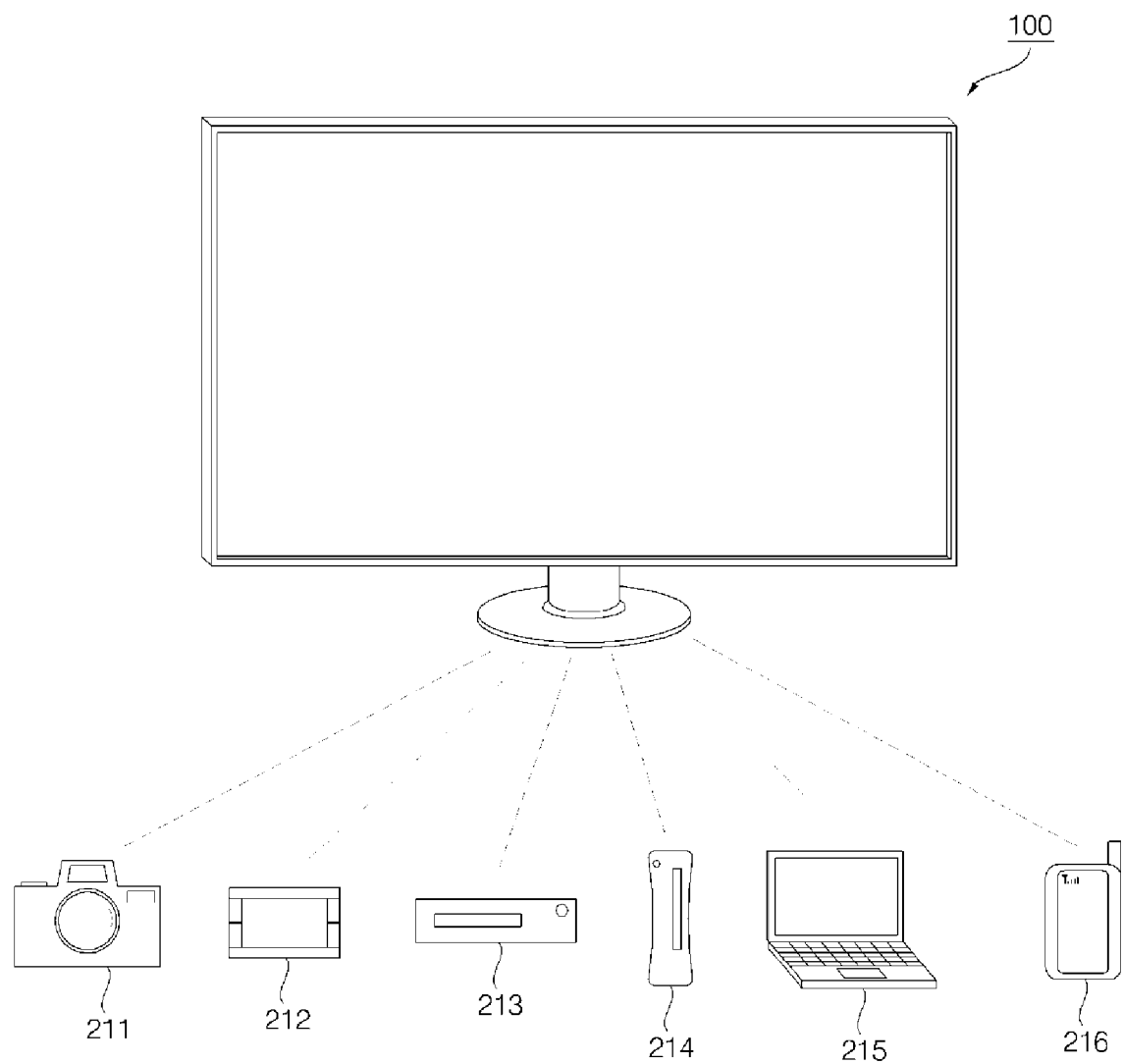
FIG. 2 illustrates various types of external devices that can be connected to the image display apparatus shown in FIG. 1.

FIG. 2 illustrates examples of an external device that can be connected to the image display apparatus 100. Referring to FIG. 3, the image display apparatus 100 may be connected either via a wired connection or wirelessly to an external device via the external signal I/O unit 130.

Examples of the external device to that the image display apparatus 100 may be connected include a camera 211, a screen-type remote control device 212, a set-top box 213, a gaming device 214, a computer 215 and a mobile communication terminal 216.

When connected to an external device via the external signal I/O unit 130, the image display apparatus 100 may display a graphic user interface (GUI) screen provided by the external device on the display unit 180. Then, a user may access both the external device and the image display apparatus 100 and may thus be able to view video data currently being played by the external device or video data present in the external device from the image display apparatus 100. In addition, the image display apparatus 100 may output audio data currently being played by the external device or audio data present in the external device via the audio output unit 185.

Various data, for example, still image files, moving image files, music files or text files, present in an external device to which the image display apparatus 100 is connected via the external signal I/O unit 130 may be stored in the storage unit 140 of the image display apparatus 100. In this case, even after disconnected from the external device, the image display apparatus 100 can output the various data stored in the storage unit 140 via the display unit 180 or the audio output unit 185.

When connected to the mobile communication terminal 216 or a communication network via the external signal I/O unit 130, the image display apparatus 100 may display a screen for providing a video or voice call service on the display unit 180 or may output audio data associated with the provision of the video or voice call service via the audio output unit 185. Thus, a user may be allowed to make or receive a video or voice call with the image display apparatus 100 that is connected to the mobile communication terminal 216 or a communication network.

FIGS. 3(a) and 3(b) illustrate block diagrams of the control unit 170, FIGS. 4(a) through 4(g) illustrate how a formatter 320 shown in FIG. 3(a) or 3(b) separates a 2-dimensional (2D) image signal and a 3-dimensional (3D) image signal, FIGS. 5(a) through 5(e) illustrate various examples of the format of a 3D image output by the formatter 320, and FIGS. 6(a) through 6(c) illustrate how to scale a 3D image output by the formatter 320.

Referring to FIG. 3(a), the control unit 170 may include an image processor 310, a formatter 320, an on-screen display (OSD) generator 330 and a mixer 340.

Referring to FIG. 3(a), the image processor 310 may decode an input image signal, and may provide the decoded image signal to the formatter 320. Then, the formatter 320 may process the decoded image signal provided by the image processor 310 and may thus provide a plurality of perspective image signals. The mixer 340 may mix the plurality of perspective image signals provided by the formatter 320 and an image signal provided by the OSD generator 330.

More specifically, the image processor 310 may process both a broadcast signal processed by the tuner unit 110 and the demodulation unit 120 and an externally input signal provided by the external signal I/O unit 130.

The input image signal may be a signal obtained by demultiplexing a stream signal.

If the input image signal is, for example, an MPEG-2-encoded 2D image signal, the input image signal may be decoded by an MPEG-2 decoder.

On the other hand, if the input image signal is, for example, an H.264-encoded 2D DMB or DVB-H image signal, the input image signal may be decoded by an H.264 decoder.

On the other hand, if the input image signal is, for example, an MPEG-C part 3 image with disparity information and depth information, not only the input image signal but also the disparity information may be decoded by an MPEG-C decoder.

On the other hand, if the input image signal is, for example, a Multi-View Video Coding (MVC) image, the input image signal may be decoded by an MVC decoder.

On the other hand, if the input image signal is, for example, a free viewpoint TV (FTV) image, the input image signal may be decoded by an FTV decoder.

The decoded image signal provided by the image processor 310 may include a 2D image signal only, include both a 2D image signal and a 3D image signal or include a 3D image signal only.

The decoded image signal provided by the image processor 310 may be a 3D image signal with various formats. For example, the decoded image signal provided by the image processor 310 may be a 3D image including a color image and a depth image or a 3D image including a plurality of perspective image signals. The plurality of perspective image signals may include a left-eye image signal L and a right-eye image signal R. The left-eye image signal L and the right-eye image signal R may be arranged in various formats such as a side-by-side format shown in FIG. 5(a), a top-down format shown in FIG. 5(b), a frame sequential format shown in FIG. 5(c), an interlaced format shown in FIG. 5(d), or a checker box format shown in FIG. 5(e).

If the input image signal includes caption data or an image signal associated with data broadcasting, the image processor 310 may separate the caption data or the image signal associated with data broadcasting from the input image signal and may output the caption data or the image signal associated with data broadcasting to the OSD generator 330. Then, the OSD generator 330 may generate 3D objects based on the caption data or the image signal associated with data broadcasting.

The formatter 320 may receive the decoded image signal provided by the image processor 310, and may separate a 2D image signal and a 3D image signal from the received decoded image signal. The formatter 320 may divide a 3D image signal into a plurality of view signals, for example, a left-eye image signal and a right-eye image signal.

It may be determined whether the decoded image signal provided by the image processor 310 is a 2D image signal or a 3D image signal based on whether a 3D image flag, 3D image metadata, or 3D image format information is included in the header of a corresponding stream.

The 3D image flag, the 3D image metadata or the 3D image format information may include not only information regarding a 3D image but also location information, region information or size information of the 3D image. The 3D image flag, the 3D image metadata or the 3D image format information may be decoded, and the decoded 3D image flag, the decoded image metadata or the decoded 3D image format information may be transmitted to the formatter 320 during the demultiplexing of the corresponding stream.

The formatter 320 may separate a 3D image signal from the decoded image signal provided by the image processor 310 based on the 3D image flag, the 3D image metadata or the 3D image format information. The formatter 320 may divide the 3D image signal into a plurality of perspective image signals with reference to the 3D image format information. For example, the formatter 320 may divide the 3D image signal into a left-eye image signal and a right-eye image signal based on the 3D image format information.

Referring to FIGS. 4(a) through 4(g), the formatter 320 may separate a 2D image signal and a 3D image signal from the decoded image signal provided by the image processor 310 and may then divide the 3D image signal into a left-eye image signal and a right-eye image signal.

More specifically, referring to FIG. 4(a), if a first image signal 410 is a 2D image signal and a second image signal 420 is a 3D image signal, the formatter 320 may separate the first and second image signals 410 and 420 from each other, and may divide the second image signal 420 into a left-eye image signal 423 and a right-eye image signal 426. The first image signal 410 may correspond to a main image to be displayed on the display unit 180, and the second image signal 420 may correspond to a picture-in-picture (PIP) image to be displayed on the display unit 180.

Figure 4:
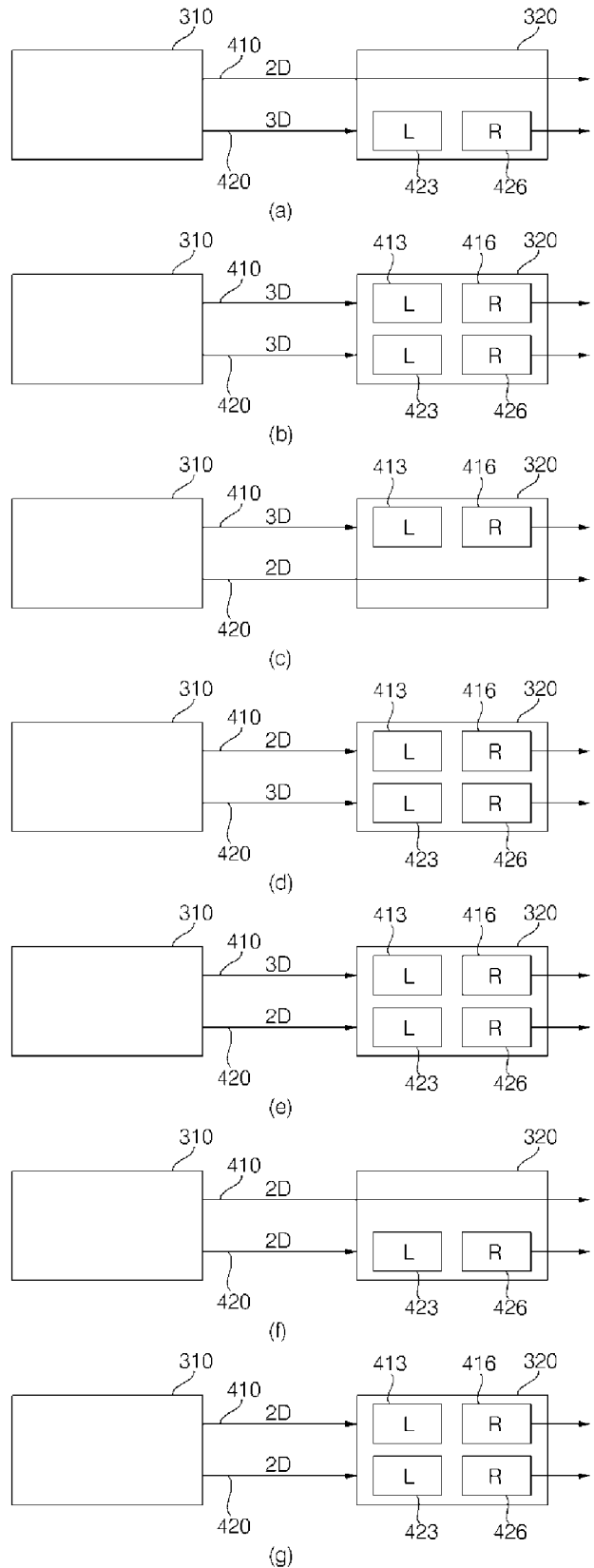
FIGS. 4(a) through 4(g) illustrate how a formatter shown in FIG. 3 separates a two-dimensional (2D) image signal and a three-dimensional (3D) image signal.

Referring to FIG. 4(*b*), if the first and second image signals 410 and 420 are both 3D image signals, the formatter 320 may separate the first and second image signals 410 and 420 from each other, may divide the first image signal 410 into a left-eye image signal 413 and a right-eye image signal 416, and may divide the second image signal 420 into the left-eye image signal 423 and the right-eye image signal 426.

Referring to FIG. 4(*c*), if the first image signal 410 is a 3D image signal and the second image signal 420 is a 2D image signal, the formatter 320 may divide the first image signal into the left-eye image signal 413 and the right-eye image signal 416.

Referring to FIGS. 4(*d*) and 4(*e*), if one of the first and second image signals 410 and 420 is a 3D image signal and the other image signal is a 2D image signal, the formatter 320 may convert whichever of the first and second image signals 410 and 420 is a 2D image signal into a 3D image signal in response to, for example, user input. More specifically, the formatter 320 may convert a 2D image signal into a 3D image signal by detecting edges from the 2D image signal using a 3D image creation algorithm, extracting an object with the detected edges from the 2D image signal, and generating a 3D image signal based on the extracted object. Alternatively, the formatter 320 may convert a 2D image signal into a 3D image signal by detecting an object, if any, from the 2D image signal using a 3D image generation algorithm and generating a 3D image signal based on the detected object. Once a 2D image signal is converted into a 3D image signal, the formatter 320 may divide the 3D image signal into a left-eye image signal and a right-eye image signal. A 2D image signal except for an object to be reconstructed as a 3D image signal may be output as a 2D image signal.

Referring to FIG. 4(*f*), if the first and second image signals 410 and 420 are both 2D image signals, the formatter 320 may convert only one of the first and second image signals 410 and 420 into a 3D image signal using a 3D image generation algorithm. Alternatively, referring to FIG. 4G, the formatter 320 may convert both the first and second image signals 410 and 420 into 3D image signals using a 3D image generation algorithm.

If there is a 3D image flag, 3D image metadata or 3D image format information available, the formatter 320 may determine whether the decoded image signal provided by the image processor 310 is a 3D image signal with reference to the 3D image flag, the 3D image metadata or the 3D image format information. On the other hand, if there is no 3D image flag, 3D image metadata or 3D image format information available, the formatter 320 may determine whether the decoded image signal provided by the image processor 310 is a 3D image signal by using a 3D image generation algorithm.

A 3D image signal provided by the image processor 310 may be divided into a left-eye image signal and a right-eye image signal by the formatter 320. Thereafter, the left-eye image signal and the right-eye image signal may be output in one of the formats shown in FIGS. 5(*a*) through 5(*e*). A 2D image signal provided by the image processor 310, however, may be output as is without the need to be processed or may be transformed and thus output as a 3D image signal.

As described above, the formatter 320 may output a 3D image signal in various formats. More specifically, referring to FIGS. 5(*a*) through 5(*e*), the formatter 320 may output a 3D image signal in a side-by-side format, a top-down format, a frame sequential format, an interlaced format, in which a left-eye image signal and a right-eye image signal are mixed on a line-by-line basis, or a checker box format, in which a left-eye image signal and a right-eye image signal are mixed on a box-by-box basis.

Figure 5:
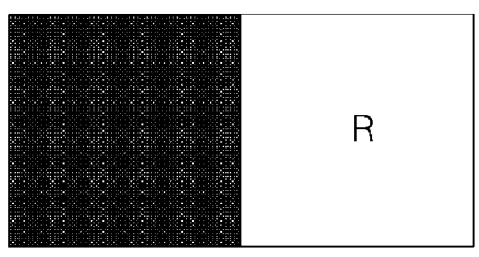
FIGS. 5(a) through 5(e) illustrate various 3D image formats provided by the formatter shown in FIG. 3.
Figure 5:
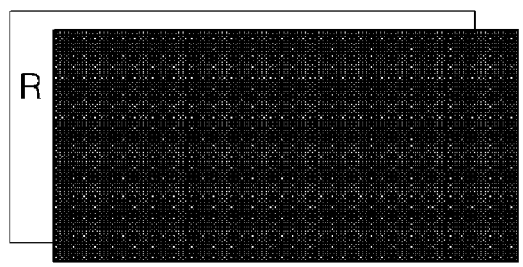
Figure 5:
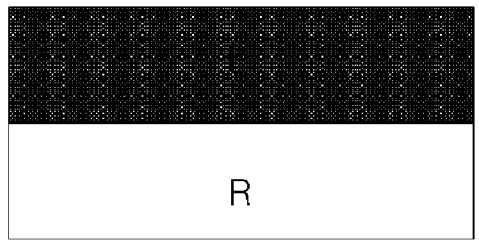
Figure 5:
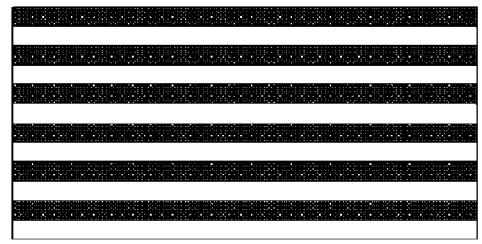
Figure 5:
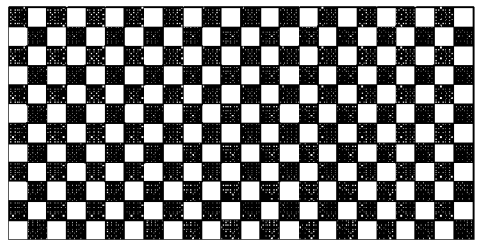

A user may select one of the formats shown in FIGS. 5(*a*) through 5(*e*) as an output format for a 3D image signal. For example, if a user selects the top-down format, the formatter 320 may reconfigure a 3D image signal input thereto, divide the input 3D image signal into a left-eye image signal and a right-eye image signal, and output the left-eye image signal and the right-eye image signal in the top-down format regardless of the original format of the input 3D image signal.

A 3D image signal input to the formatter 320 may be a broadcast image signal, an externally-input signal or a 3D image signal with a predetermined depth level. The formatter 320 may divide the 3D image signal into a left-eye image signal and a right-eye image signal.

Left-eye image signals or right-eye image signals extracted from 3D image signals having different depths may differ from one another. That is, a left-eye image signal, a right-eye image signal extracted from a 3D image signal, or the disparity between the extracted left-eye image signal and right-eye image signal may change according to the depth of the 3D image signal.

If the depth of a 3D image signal is changed in accordance with a user input or user settings, the formatter 320 may divide the 3D image signal into a left-eye image signal and a right-eye image signal in consideration of the changed depth.

The formatter 320 may scale a 3D image signal and/or a corresponding 3D object in a 3D image signal, in various manners.

Figure 6:
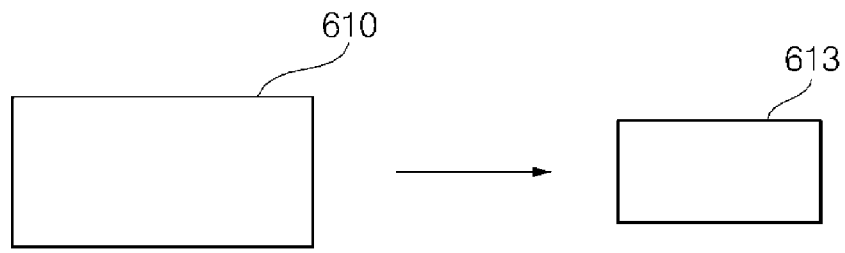
FIGS. 6(a) through 6(c) illustrate how the formatter shown in FIG. 3 scales a 3D image.
Figure 6:
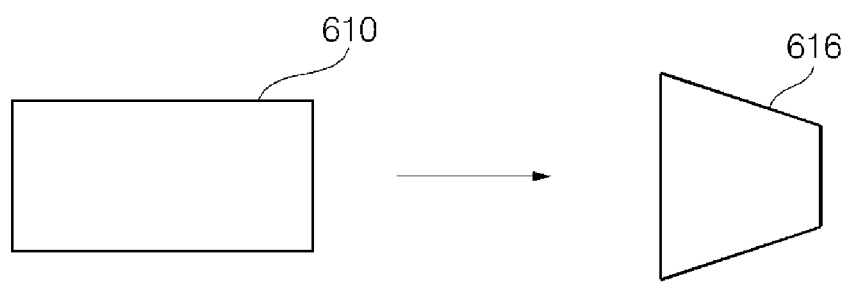
Figure 6:
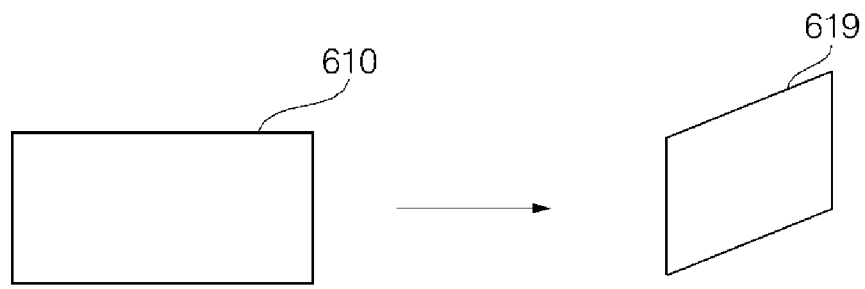

More specifically, referring to FIG. 6(*a*), the formatter 320 may generally enlarge or reduce a 3D image signal or a 3D object in the 3D image signal 610 to produce a corresponding image/object 613. Alternatively, referring to FIG. 6(*b*), the formatter 320 may partially enlarge or reduce the 3D image signal or the 3D object into a trapezoid 616. Alternatively, referring to FIG. 6(*c*), the formatter 320 may rotate the 3D image signal or the 3D object 610 and thus transform the 3D object or the 3D object into a parallelogram 619. In this manner, the formatter 320 may add a sense of three-dimensionality to the 3D image signal or the 3D object and may thus emphasize a 3D effect. The 3D image signal may be a left-eye image signal or a right-eye image signal of the second image signal 420. Alternatively, the 3D image signal may be a left-eye image signal or a right-eye image signal of a PIP image.

In short, the formatter 320 may receive the decoded image signal provided by the image processor 310, may separate a 2D image signal or a 3D image signal from the received image signal, and may divide the 3D image signal into a left-eye image signal and a right-eye image signal. Thereafter, the formatter 320 may scale the left-eye image signal and the right-eye image signal and may then output the results of the scaling in one of the formats shown in FIGS. 5(*a*) through 5(*e*). Alternatively, the formatter 320 may rearrange the left-eye image signal and the right-eye image signal in one of the formats shown in FIGS. 5(*a*) through 5(*e*) and may then scale the result of the rearrangement.

Figure 3:
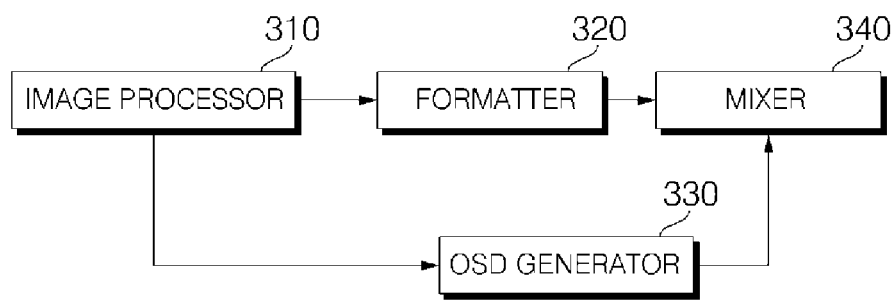
FIGS. 3(a) and 3(b) illustrate block diagrams of a control unit shown in FIG. 1.
Figure 3:
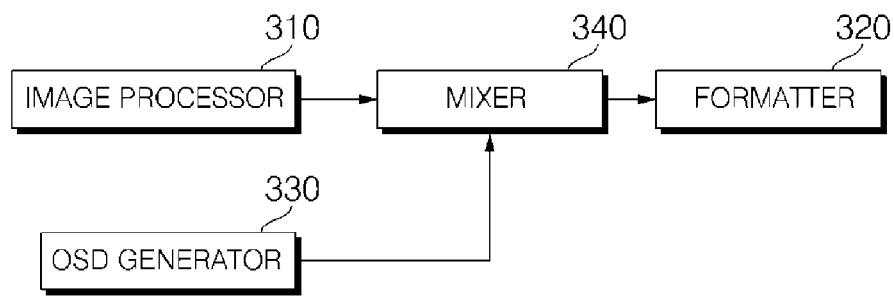

Referring to FIG. 3(*a*), the OSD generator 330 may generate an OSD signal in response to or without user input. The OSD signal may include a 2D OSD object or a 3D OSD object.

It may be determined whether the OSD signal includes a 2D OSD object or a 3D OSD object based on user input, the size of the object or whether the OSD object of the OSD signal is an object that can be selected.

The OSD generator 330 may generate a 2D OSD object or a 3D OSD object and output the generated OSD object, whereas the formatter 320 merely processes the decoded image signal provided by the image processor 310. A 3D OSD object may be scaled in various manners, as shown in FIGS. 6(*a*) through 6(*c*). The type or shape of a 3D OSD object may vary according to the depth at which the 3D OSD is displayed.

The OSD signal may be output in one of the formats shown in FIGS. 5(*a*) through 5(*e*). More specifically, the OSD signal may be output in the same format as that of an image signal output by the formatter 320. For example, if a user selects the top-down format as an output format for the formatter 320, the top-down format may be automatically determined as an output format for the OSD generator 330.

The OSD generator 330 may receive a caption- or data broadcasting-related image signal from the image processor 310, and may output a caption- or data broadcasting-related OSD signal. The caption- or data broadcasting-related OSD signal may include a 2D OSD object or a 3D OSD object.

The mixer 340 may mix an image signal output by the formatter 320 with an OSD signal output by the OSD generator 330, and may output an image signal obtained by the mixing. The image signal output by the mixer 340 may be transmitted to the display unit 180.

The control unit 170 may have a structure shown in FIG. 3(*b*). Referring to FIG. 3(*b*), the control unit 170 may include an image processor 310, a formatter 320, an OSD generator 330 and a mixer 340. The image processor 310, the formatter 320, the OSD generator 330 and the mixer 340 are almost the same as their respective counterparts shown in FIG. 3(*a*), and thus will hereinafter be described, focusing mainly on differences with their respective counterparts shown in FIG. 3(*a*).

Referring to FIG. 3(*b*), the mixer 340 may mix a decoded image signal provided with the image processor 310 with an OSD signal provided by the OSD generator 330, and then, the formatter 320 may process an image signal obtained by the mixing performed by the mixer 340. Thus, the OSD generator 330 shown in FIG. 3(*b*), unlike the OSD generator 330 shown in FIG. 3(*a*), does no need to generate a 3D object. Instead, the OSD generator 330 may simply generate an OSD signal corresponding to any given 3D object.

Referring to FIG. 3(*b*), the formatter 320 may receive the image signal provided by the mixer 340, may separate a 3D image signal from the received image signal, and may divide the 3D image signal into a plurality of perspective image signals. For example, the formatter 320 may divide a 3D image signal into a left-eye image signal and a right-eye image signal, may scale the left-eye image signal and the right-eye image signal, and may output the scaled left-eye image signal and the scaled right-eye image signal in one of the formats shown in FIGS. 5(*a*) through 5(*e*).

The structure of the control unit 170 shown in FIG. 3(*a*) or 3(*b*) is exemplary. The elements of the control unit 170 may be incorporated into fewer modules, new elements may be added to the control unit 170 or some of the elements of the control unit 170 may not be provided. That is, two or more of the elements of the control unit 170 may be incorporated into a single module, or some of the elements of the control unit 170 may each be divided into two or more smaller units. The functions of the elements of the control unit 170 are also exemplary, and thus do not put any restrictions on the scope of the present invention.

Figure 7A:
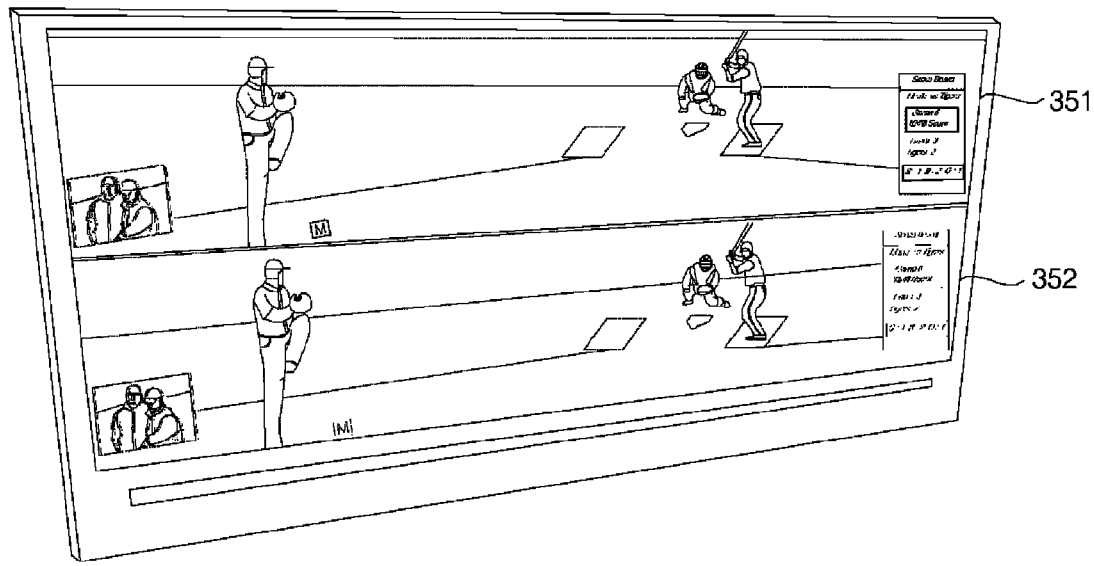
FIGS. 7A through 7C illustrate various images that can be displayed by the image display apparatus shown in FIG. 1.
Figure 7B:
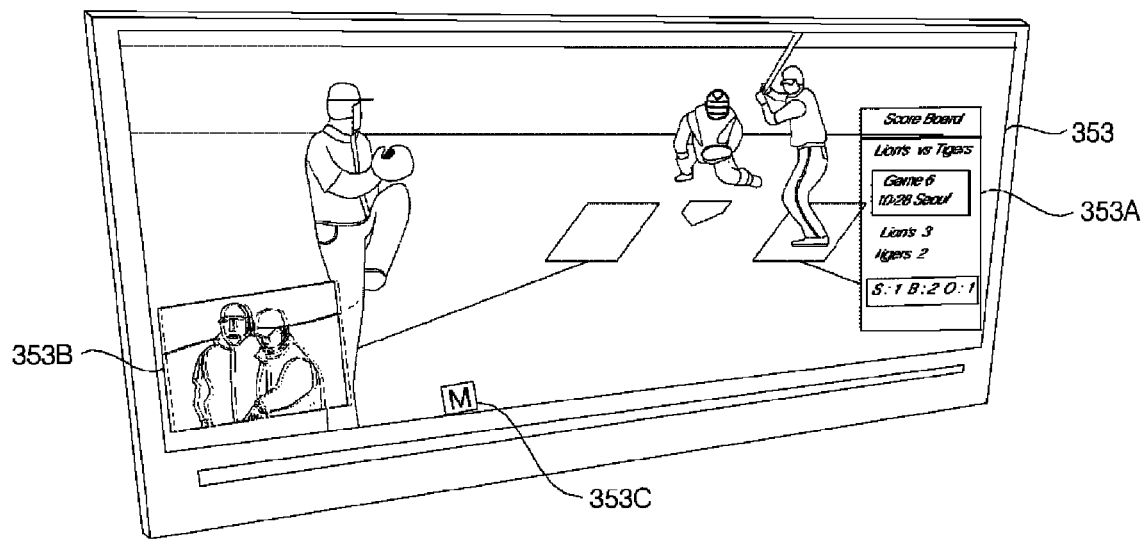
Figure 7C:
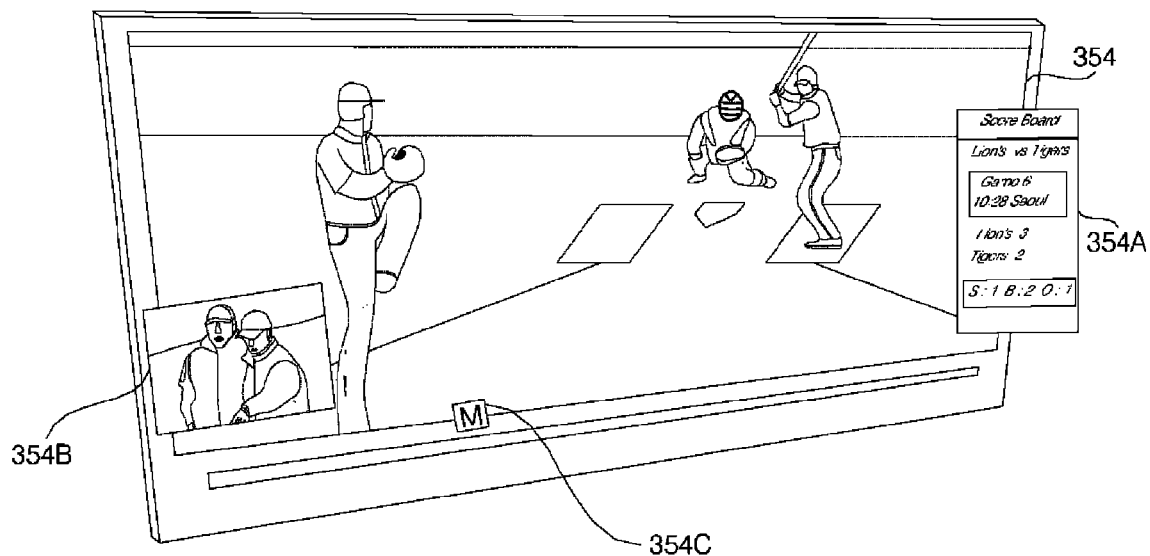

FIGS. 7A through 7C illustrate various images that can be displayed by the image display apparatus 100. Referring to FIGS. 7A through 7C, the image display apparatus 100 may display a 3D image in one of the formats shown in FIGS. 5(*a*) through 5(*e*), e.g., the top-down format.

More specifically, referring to FIG. 7A, when the play of video data is terminated, the image display apparatus 100 may display two perspective images 351 and 352 in the top-down format so that the two perspective images 351 and 352 can be arranged side by side vertically on the display unit 180.

The image display apparatus 100 may display a 3D image on the display unit 180 using a method that requires the use of polarized glasses to properly view the 3D image. In this case, when viewed without polarized glasses, the 3D image and 3D objects in the 3D image may not appear in focus, as indicated by reference numerals 353 and 353A through 353C.

On the other hand, when viewed with polarized glasses, not only the 3D image but also the 3D objects in the 3D image may appear in focus, as indicated by reference numerals 354 and 354A through 354C. The 3D objects in the 3D image may be displayed as if protruding beyond the 3D image.

If the image display apparatus 100 displays a 3D image using a method that does not require the use of polarized glasses to properly view the 3D image, the 3D image and 3D objects in the 3D image may all appear in focus even when viewed without polarized glasses, as shown in FIG. 7C.

The term 'object,' as used herein, includes various information regarding the image display apparatus 100 such as audio output level information, channel information, or current time information and an image or text displayed by the image display apparatus 100.

For example, a volume control button, a channel button, a control menu, an icon, a navigation tab, a scroll bar, a progressive bar, a text box and a window that can be displayed on the display unit 180 of the image display apparatus 100 may be classified as objects.

A user may acquire information regarding the image display apparatus 100 or information regarding an image displayed by the image display apparatus 100 from various objects displayed by the image display apparatus 100. In addition, a user may input various commands to the image display apparatus 100 through various objects displayed by the image display apparatus 100.

When a 3D object has as positive depth level, it may be displayed as if protruding toward a user. The depth on the display module 180 or the depth of a 2D image or a 3D image displayed on the display unit 180 may be set to 0. When a 3D object has a negative depth level, it may be displayed as if recessed into the display unit 180. As a result, the greater the depth of a 3D object is, the more the 3D object appears protruding toward a user.

The term '3D object,' as used herein, includes various objects generated through, for example, a scaling operation, as described above with reference to FIGS. 6(*a*) through 6(*c*), so as to create a sense of three-dimensionality or the illusion of depth.

FIG. 7C illustrates a PIP image as an example of a 3D object, but the present invention is not restricted to this. That is, electronic program guide (EPG) data, various menus provided by the image display apparatus 100, widgets or icons may also be classified as 3D objects.

Figure 8:
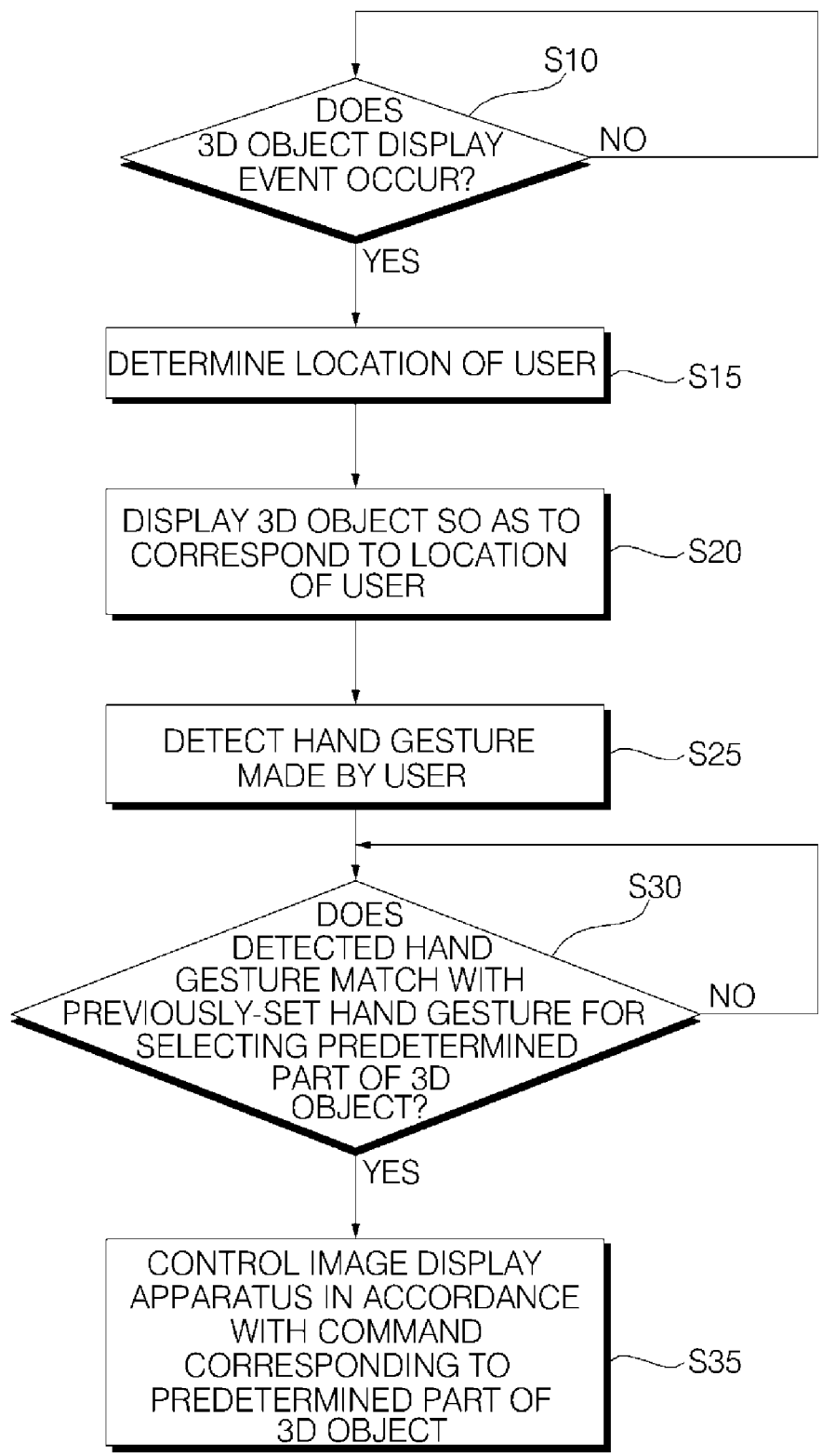
FIGS. 8 through 16B illustrate diagrams for explaining the operation of the image display apparatus shown in FIG. 1.

FIG. 8 illustrates a flowchart of an operating method of an image display apparatus according to a first exemplary embodiment of the present invention. In the first exemplary embodiment, the image display apparatus 100 may determine the location of a reference point upon the occurrence of a 3D object display event that corresponds to an event that requires the display of a 3D object. The 3D object display event may occur in response to the input of a 3D object display command to the image display apparatus 100 by a user. The 3D object display event may also occur in response to a predetermined signal received by the image display apparatus 100 or upon the arrival of a predetermined scheduled time.

The reference point may be a user who is watching the image display apparatus 100. The image display apparatus 100 may display a 3D object in consideration of the location of the user or the reference point. Alternatively, the reference point may be, for example, a sensor attached onto a part of the body of the user. In this case, the image display apparatus 100 may determine the body part where the sensor is attached and the movement of the body part where the sensor is attached with the use of the sensor unit and/or the sensor. The sensor may be a pen or a remote control device. The image display apparatus 100 may determine the location of the reference point based on the movement of the body part where the sensor is attached.

Referring to FIG. 8, the control unit 170 of the image display apparatus 100 may determine whether a 3D object display event has occurred (S10). In the first exemplary embodiment, 3D objects may be objects representing various information that can be displayed by the image display apparatus 100. For example, if an event that requires the display of weather-related information has occurred, the image display apparatus 100 may display today's weather information using text or an image to which a stereoscopic effect is applied or using a popup window to which a stereoscopic effect is applied so that the popup window can appear protruding toward a user. In this case, the text, the image or the popup window to which a stereoscopic effect is applied may be classified as a 3D object.

A 3D object display event may occur in response to a user command or upon the arrival of a predefined scheduled time. For example, if a user inputs a command to display weather information to the image display apparatus 100 using the remote control device 200, an event for displaying weather-related information may occur. The event for displaying weather-related information may also occur upon the arrival of a scheduled time set in a scheduler.

Thereafter, the control unit 170 may determine the location of a user with the aid of the position sensor of the sensor unit (S15). The position sensor may include various types of tools for determining the location of the user. For example, the position sensor may include an infrared (IR) sensor capable of sensing the location of the user, or a camera capable of capturing an image so as to calculate the location of the user with the use of a predetermined algorithm. The control unit 170 may determine the distance between the image display apparatus 100 and the user based on sensing data provided by the position sensor.

Thereafter, the control unit 170 may display a 3D object so as to correspond to the location of the user (S20). More specifically, the control unit 170 may display a 3D object in consideration of the distance between the image display apparatus 100 and the user so as for the user to feel as if the 3D object were actually located directly ahead. The control unit 170 may also consider the positions of the eyes of the user or the height of the user when display the 3D object.

Thereafter, the control unit 170 may detect a hand gesture, if any, made by the user with the aid of, for example, the motion sensor of the sensor unit (S25). The motion sensor may include a camera detecting the hand of the user and capturing an image of the hand gesture made by the user.

Thereafter, the control unit 170 may determine whether the detected hand gesture matches with any one of a plurality of previously-set hand gestures stored in the storage unit 140 (S30). The plurality of previously-set hand gestures may correspond to a plurality of commands, respectively, for controlling the operation of the image display apparatus 100.

If there is a match for the detected hand gesture in the storage unit 140, the control unit 170 may control the image display apparatus 100 in response to a command corresponding to the previously-set hand gesture that matches with the detected hand gesture (S35). For example, if the command corresponding to the previously-set hand gesture that matches with the detected hand gesture is a command to select a button in the 3D object displayed in operation S20, the control unit 170 may perform an operation corresponding to the button, for example, volume control or screen control, on the image display apparatus 100. On the other hand, if the command corresponding to the previously-set hand gesture that matches with the detected hand gesture is a command to select a button for deleting the 3D object displayed in operation S20, the control unit 170 may delete the 3D object displayed in operation S20.

Figure 9A:
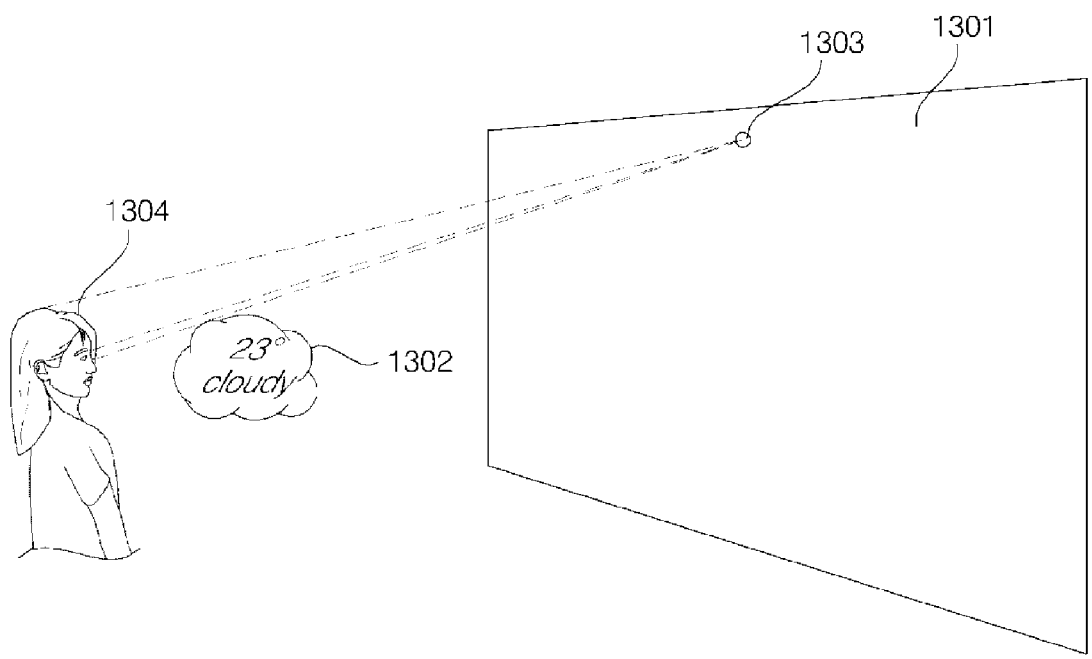
Figure 9B:
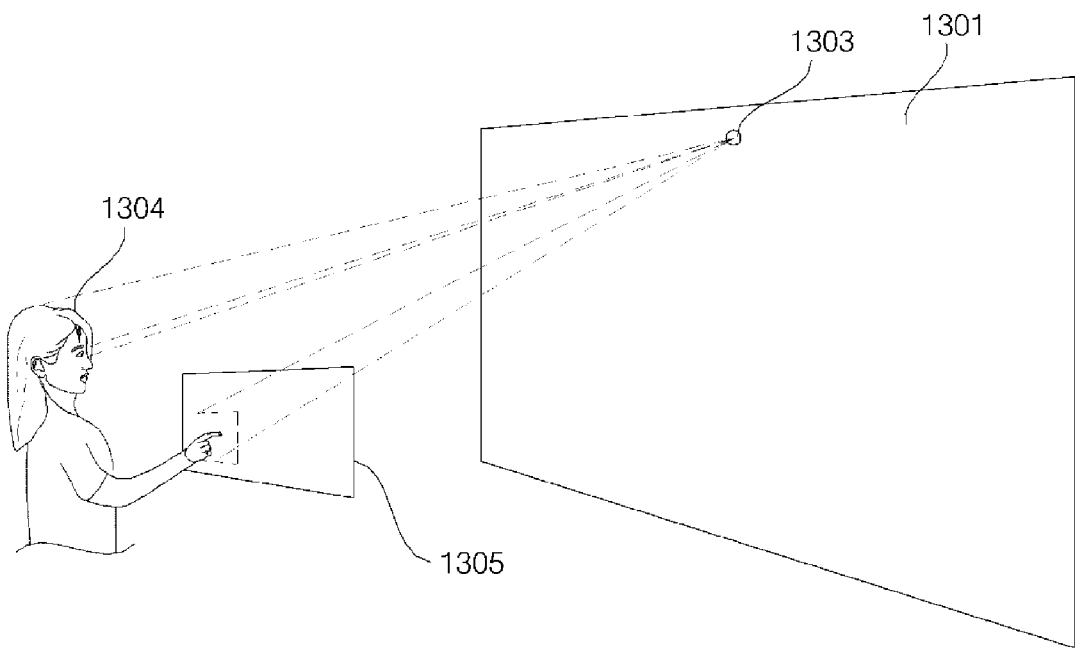

FIGS. 9A and 9B illustrate diagrams for explaining an operating method of an image display apparatus according to a second exemplary embodiment of the present invention. Referring to FIG. 9A, a main screen 1301 showing a main image that the user wishes to view mainly or a screen image having a reference size or greater, may be displayed on the display unit 180, and a 3D object 1302 may be displayed so as to appear as if located closer than the main screen 1301 to a user 1304. In the second exemplary embodiment, the 3D object 1302 may be processed so as to appear protruding toward the user 1304. The 3D object 1302 and the main screen 1301 may have different depths.

A camera 1303 may be installed at the front of the image display apparatus 100 in order to perform the functions of a position sensor or a motion sensor. The control unit 170 may determine the location of the user 1304 (and particularly, the distance between the image display apparatus 100 and the user 1304 and the positions of the eyes of the user 1304) based on an image of the user 1304 captured by the camera 1303. Thereafter, the control unit 170 may display the 3D object 1302 in front of the user 1304 at the same height as that of the eyes of the user 1304.

The 3D object 1302 may be an object representing information that can be displayed by the image display apparatus 100. The control unit 170 may process an image signal so as to display the 3D object 1302 in front of the user 1304 at the same height as that of the eyes of the user 1304. Thus, the user 1304 may feel as if the 3D object 1302 actually protruded toward him or her beyond the main screen 1301.

Referring to FIG. 9B, the control unit 170 may display a 3D object 1305 allowing the user 1304 to input a command to the image display apparatus 100. The 3D object 1305 may be a popup window including a number of buttons or icons for inputting various commands to the image display apparatus 100.

More specifically, the control unit 170 may display the 3D object 1305 in front of the user 1304 at the same height as that of the hand of the user 1304 in order to help the user 1304 easily select the buttons or icons included in the 3D object 1305. If one of the buttons or icons included in the 3D object 1305 is selected by the user 1304, the control unit 170 may control the image display apparatus 100 in accordance with a command corresponding to the selected button or icon.

The control unit 170 may determine which of the buttons or icons included in the 3D object 1305 is selected by the user 1304 based on a hand gesture made by the user 1304.

Figure 10:
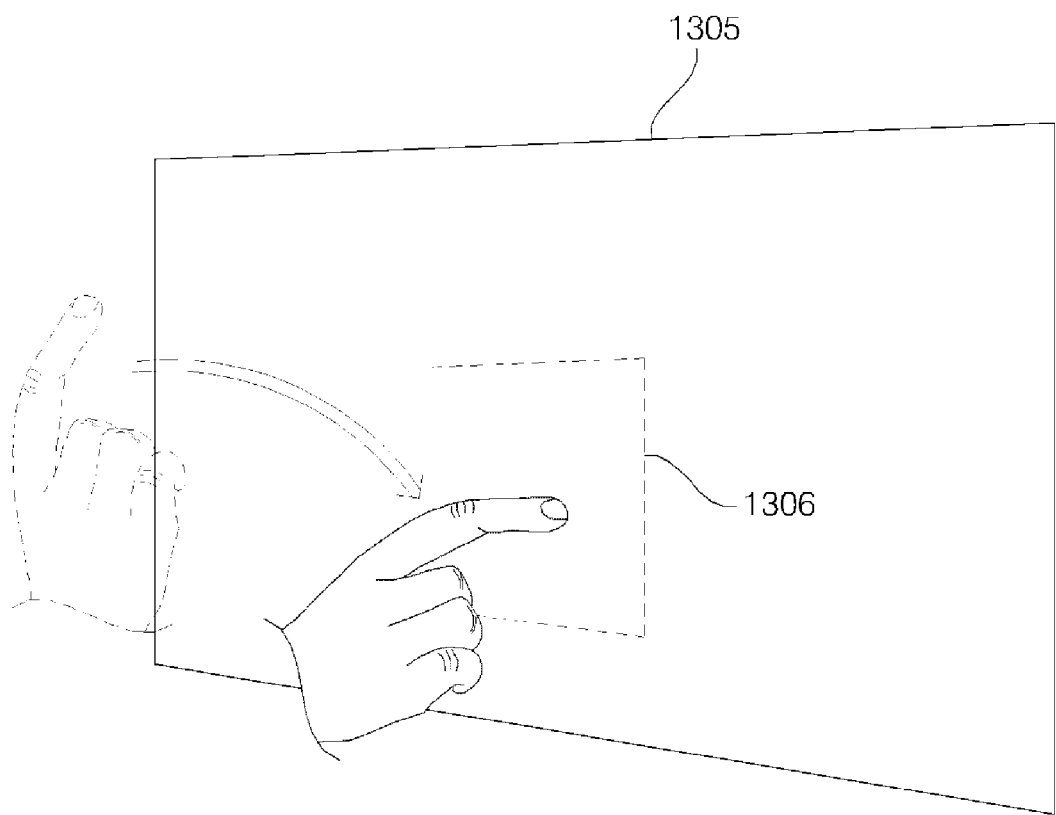

FIG. 10 illustrates a diagram for explaining an operating method of an image display apparatus according to a third exemplary embodiment of the present invention. Referring to FIG. 10, a user may select a certain part 1306 of the 3D object 1305 simply by making a certain hand gesture.

More specifically, if a hand gesture made by a user is detected by the camera 1303, the control unit 170 may determine whether the detected hand gesture matches with a previously-set hand gesture for selecting the certain part 1306 of the 3D object 1305. If the detected hand gesture matches with the previously-set hand gesture for selecting the certain part 1306 of the 3D object 1305, the control unit 170 may determine the position of the hand of the user based on an image of the user captured by the camera 1303, and may identify the certain part 1306 of the 3D object 1305 based on the result of the determination.

The certain part 1306 of the 3D object 1305 may include a button or icon for inputting a command to the image display apparatus 100. The control unit 170 may control the image display apparatus 100 in accordance with the command corresponding to the button or icon included in the certain part 1306 of the 3D object 1305.

A previously-set hand gesture for selecting a 3D object may be stored in the storage unit 140. The control unit 170 may detect a hand gesture made by a user with the aid of the sensor unit, and may determine whether the detected hand gesture matches with the previously-set hand gesture for selecting a 3D object. If the detected hand gesture matches with the previously-set hand gesture for selecting a 3D object, the control unit 170 may determine that a command to select a 3D object has been issued.

Figure 11A:
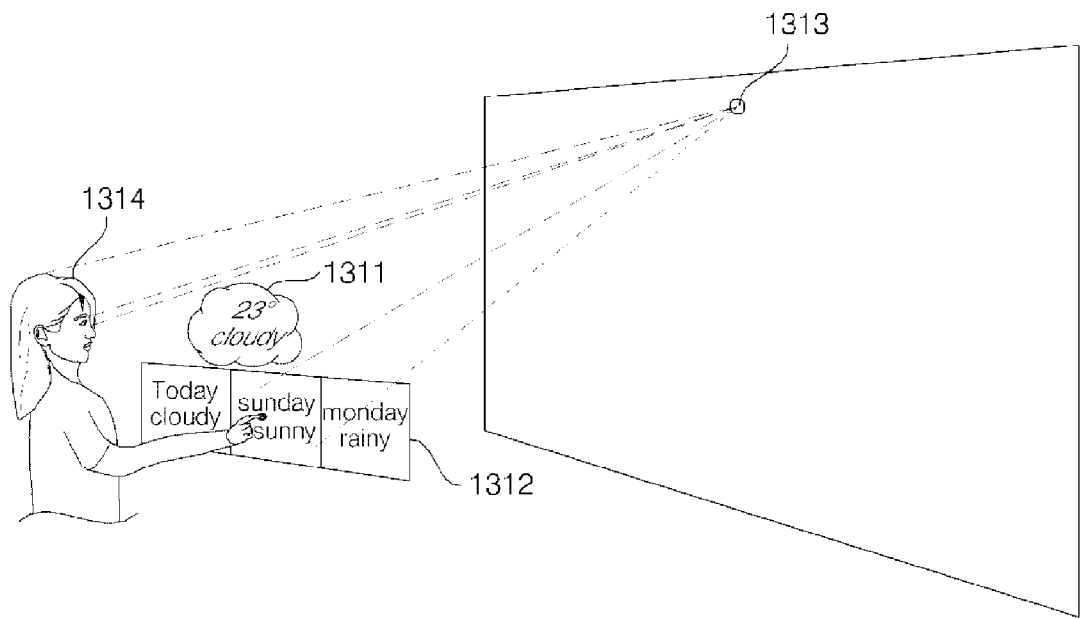
Figure 11B:
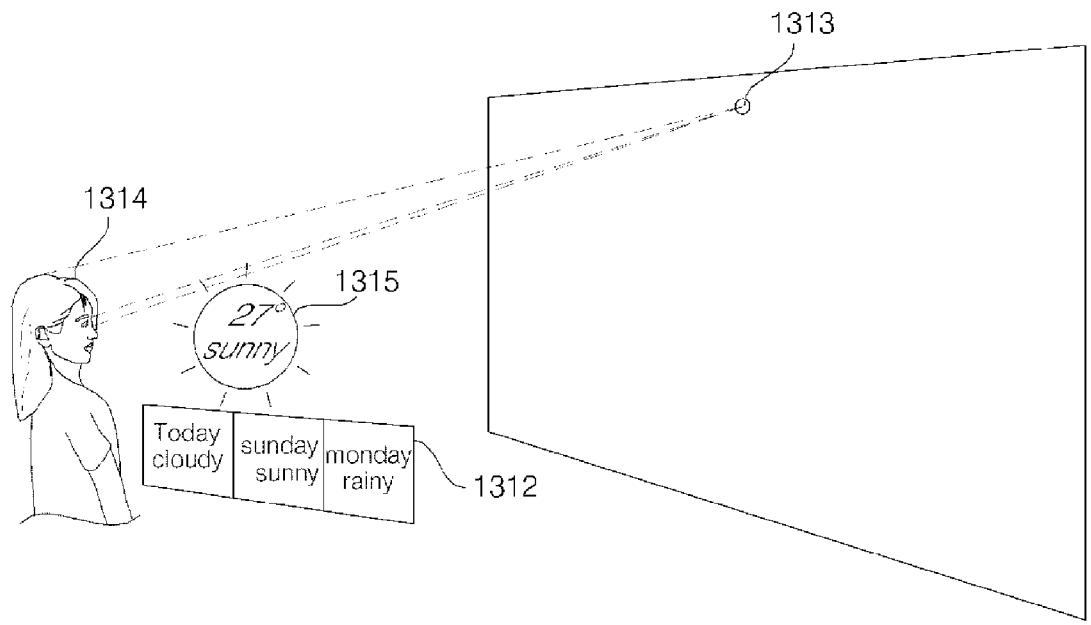

FIGS. 11A and 11B illustrate diagrams for explaining an operating method of an image display apparatus according to a fourth exemplary embodiment of the present invention. In the fourth exemplary embodiment, the control unit 170 may control the image display apparatus 100 in accordance with a command input by a user via a 3D object. In addition, in the fourth exemplary embodiment, the control unit 170 may change the state of display of a 3D object in accordance with a command input by a user.

Referring to FIG. 11A, if an event for displaying weather information occurs in response to a user command or upon the arrival of a scheduled time set by a user 1314, the control unit 170 may determine the location of the user 1314 using a position sensor. More specifically, the control unit 170 may determine the distance between the user 1314 and the image display apparatus 100, the positions of the eyes of the user 1314, and the height and position of the hand of the user 1314.

The control unit 170 may display a 3D object 1311 showing weather information in front of the user 1314 at the same height as that of the eyes of the user 1314. The 3D object 1311 may include an image representing the weather information. If today's weather is, for example, cloudy, the 3D object 1311 may include an image of a cloud, and may be displayed in front of the user 1314 at the same height as that of the eyes of the user 1314.

The control unit 170 may also display a 3D object 1312, that includes a popup window allowing the user 1314 to input a command to the image display apparatus 100, in front of the user 1314 at the same height as that of the hand of the user 1314. The popup window may be a popup window for allowing the user 1314 to select any desired date in order to be provided with detailed weather forecast information regarding the desired date. If the user 1314 selects one of a number of dates listed in the popup window, the control unit 170 may determine which of the dates listed in the popup window is selected by the user 1314 based on a hand gesture made by the user 1314 and the position of the hand of the user 1314, that are detected by the camera 1313. For example, if the user 1314 inputs a command to display Sunday's weather information to the image display apparatus 100, the control unit 170 may display a 3D object 1315 showing Sunday's weather information in front of the user 1314 at the same height as that of the eyes of the viewer 1314, as shown in FIG. 11B. If Sunday's weather is forecast to be, for example, sunny, the 3D object 1315 may include an image of the Sun.

Figure 12A:
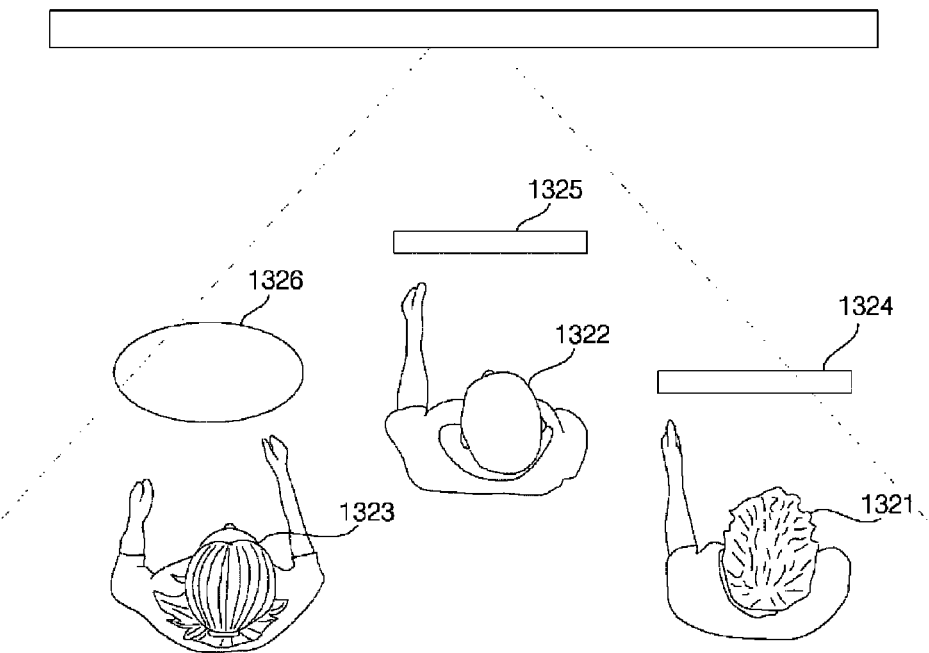
Figure 12B:
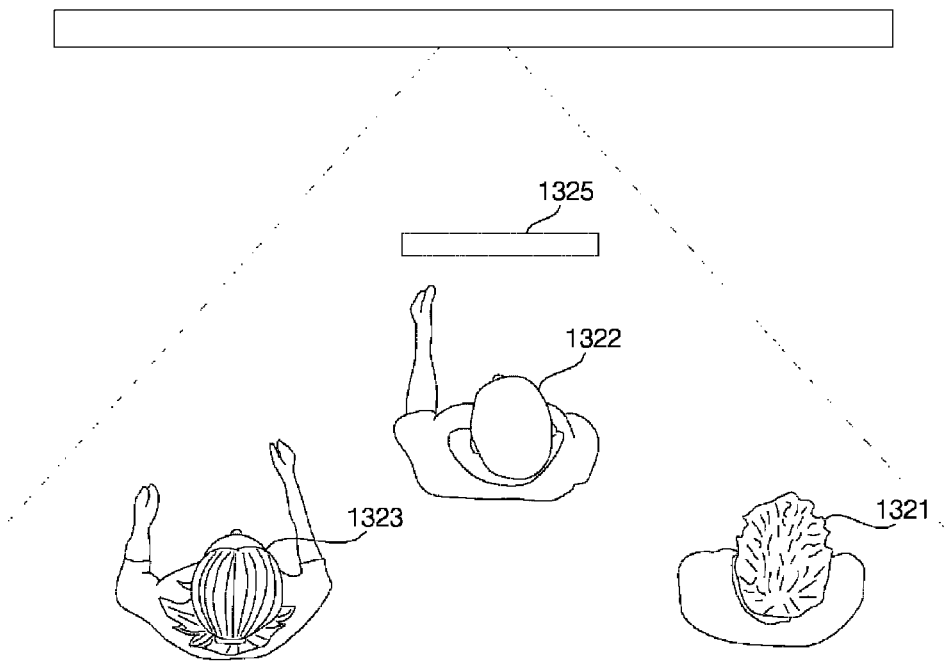

FIGS. 12A and 12B illustrate diagrams for explaining an operating method of an image display apparatus according to a fifth exemplary embodiment of the present invention. The image display apparatus 100 may be viewed by two or more viewers. In the fifth exemplary embodiment, the image display apparatus 100 may be viewed by three viewers 1321, 1322 and 1323.

The position sensor of the image display apparatus 100 may sense the locations of the viewers 1321, 1322 and 1323. Then, the control unit 170 may determine the number of viewers currently watching the image display apparatus 100 and the distances between the image display apparatus 100 and each of the viewers currently watching the image display apparatus 100 based on the results of the sensing performed by the position sensor.

If a 3D object display event occurs, the control unit 170 may display a number of 3D objects corresponding to the number of viewers currently watching the image display apparatus 100 in front of the viewers currently watching the image display apparatus 100. More specifically, referring to FIG. 12A, the control unit 170 may perform signal processing and may thus display 3D objects 1324, 1325 and 1326 so as to appear as if they were located directly in front of the viewers 1321, 1322 and 1323, respectively, in consideration of the distances between the image display apparatus 100 and the viewers 1321, 1322 and 1333.

The control unit 170 may determine the height of the eyes of each of the viewers 1321, 1322 and 1333 and the height of the hand of each of the viewers 1321, 1322 and 1333, and may then determine the heights at that the 3D objects 1324, 1325 and 1326 should be displayed based on the results of the determination.

For example, the 3D object 1324 or 1325, including a popup window having a button or icon for inputting a command to the image display apparatus 100, may be displayed in front of the viewer 1321 or 1322 at the same height as that of the hand of the viewer 1321 or 1322 in order to help the viewer 1321 or 1322 select the button or icon.

The 3D object 1326 may show various information that can be displayed by the image display apparatus 100, and may be displayed in front of the viewer 1323 at the same height as that of the eyes of the viewer 1323. Thus, the viewer 1323 may feel as if the 3D object 1326 were right before his or her eyes.

Referring to FIG. 12B, if there are at least two reference points available, the priority levels of the reference points may be determined, one of the reference points may be selected in consideration of the priority levels of the reference points, and a 3D object may be displayed at a position corresponding to the corresponding reference point.

More specifically, if a 3D object display event occurs, the image display apparatus 100 may receive a signal for determining the locations of one or more reference points. The received signal may include information provided by the sensor unit regarding the location of a user. The image display apparatus 100 may be able to determine the locations of at least three reference points.

Once the locations of a number of reference points are determined, the priority levels of the reference points may be determined based on the distances between the image display apparatus 100 and the reference points. Referring to FIG. 12B, since the viewer 1322 is located closer than the viewers 1321 and 1323 to the image display apparatus 100, a 3D object 1325 may be displayed in front of the viewer 1322.

Alternatively, if there are at least two reference points available, the image display apparatus 100 may determine the priority levels of the reference points, and may display a 3D object at a location corresponding to whichever of the reference points has a higher priority level than the other. For example, the image display apparatus 100 may display a 3D object at a location corresponding to a reference point with a first priority level. Then, if the reference point with the first priority level is no longer available, the 3D object may be displayed at a location corresponding to the reference point with the second priority level. If the reference point with the first priority level moves, the 3D object may be moved along with the reference point with the first priority level.

Figure 13A:
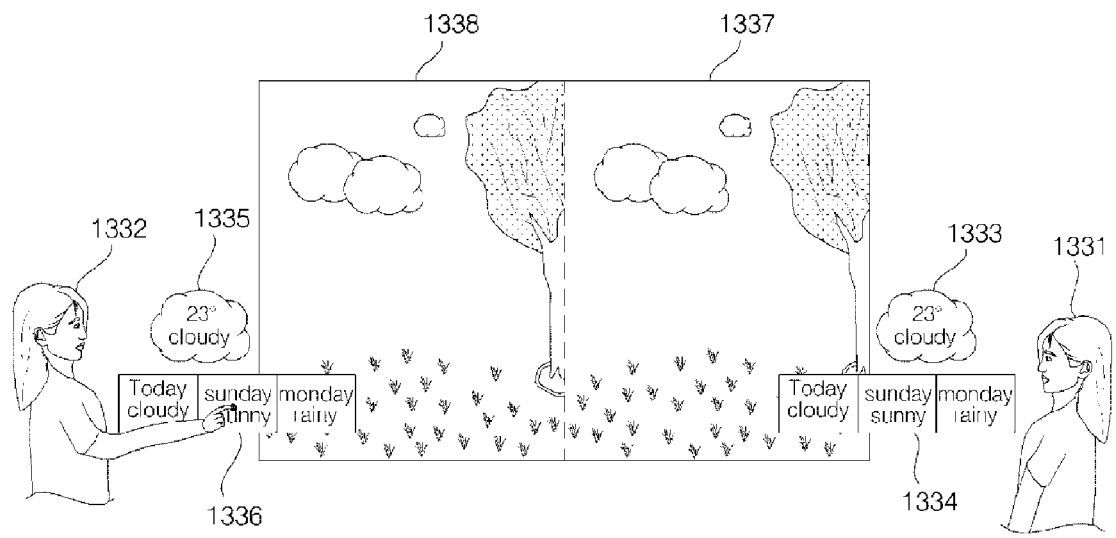
Figure 13B:
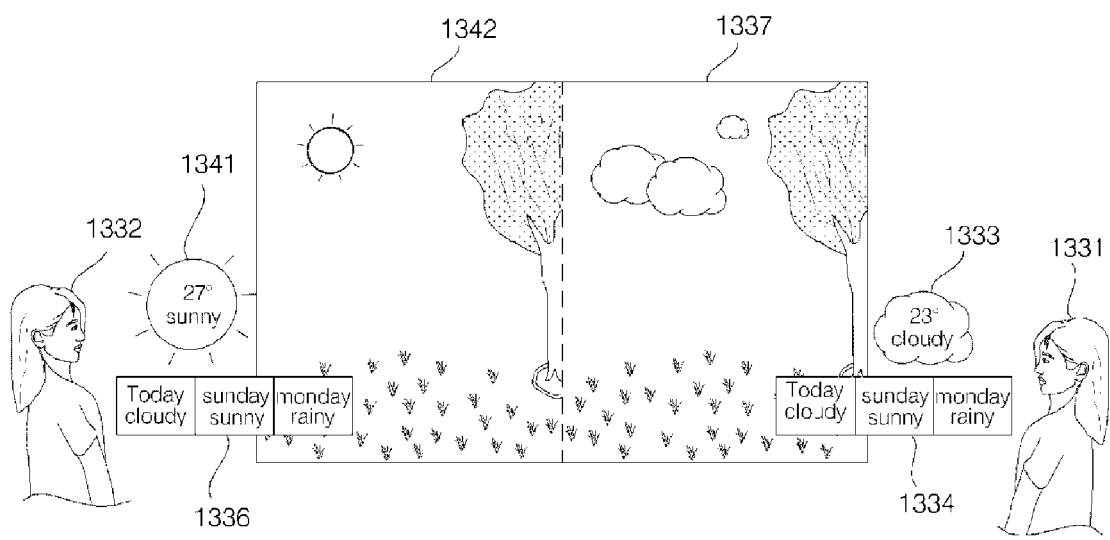

FIGS. 13A and 13B illustrate diagrams for explaining an operating method of an image display apparatus according to a sixth exemplary embodiment of the present invention. In the sixth exemplary embodiment, the image display apparatus 100 may display a number of 3D objects for each of a plurality of viewers currently watching the image display apparatus 100 so that the viewers can independently control the image display apparatus 100 through the 3D objects.

Referring to FIG. 13A, the control unit 170 may display a 3D object showing weather information in response to a command to display weather information input thereto or upon the arrival of a scheduled time for the display of weather information. The control unit 170 may determine the number of viewers currently watching the image display apparatus 100 and the locations of the viewers currently watching the image display apparatus 100 with the aid of the position sensor of the sensor unit. Thereafter, the control unit 170 may display a number of 3D objects before each of the viewers currently watching the image display apparatus 100. For example, the control unit 170 may display 3D objects 1333 and 1334 in front of a first viewer 1331, and 3D objects 1335 and 1336 in front of a second viewer 1332.

Each of the 3D objects 1333 and 1335 may include an image representing weather information, and may be displayed in front of a corresponding viewer at the same height as that of the eyes of the corresponding viewer. Each of the 3D objects 1334 and 1336 may allow a corresponding viewer to select any desired date in order to be provided with detailed weather forecast information regarding the desired date, and may be displayed in front of the corresponding viewer at the same height as that of the hand of the corresponding viewer. The 3D objects 1334 and 1336 may be displayed as popup windows.

Referring to FIG. 13A, the control unit 170 may divide a main screen into a plurality of sub-screens, each showing weather information, in order to improve the convenience of watching the main screen for the first and second viewers 1331 and 1332. More specifically, the control unit 170 may display a first screen 1337 in a display region corresponding to the first viewer 1331 and a second screen 1338 in a display region corresponding to the second viewer 1332.

The second viewer 1332 may select one of a number of dates listed in the 3D object 1336 that is displayed in front of the second user 1332 by making a hand gesture, and may thus be provided with detailed weather information corresponding to the selected date. The control unit 170 may determine which of the dates listed in the 3D object 1336 has been selected by the second viewer 1332 based on the hand gesture made by the second viewer 1332 and the position of the hand of the second viewer 1332.

The control unit 170 may control the image display apparatus 100 in accordance with a command input thereto by the second viewer 1332. In the sixth exemplary embodiment, the control unit 170 may change the state of display of a 3D object or a screen displayed by the image display apparatus 100 in accordance with a command input thereto by the second viewer 1332.

Referring to FIG. 13B, if the second viewer 1332 inputs a command to display Sunday's weather information to the image display apparatus 100, the control unit 170 may replace the 3D object 1335 showing today's weather information with a 3D object 1341 showing Sunday's weather information, and may replace the second screen 1338 representing today's weather with a second screen 1342 representing Sunday's weather. For example, if Sunday's weather is forecast to be sunny, the control unit 170 may display the 3D object 1341, including an image of the Sun, in front of the second viewer 1332 at the same height as that of the eyes of the second viewer 1332, and may display the second screen 1342, that renders an image of a sunny day, in the display region corresponding to the second viewer 1332. The 3D objects 1333, 1334, 1341 and 1336 may be changed individually. Likewise, the first and second screens 1337 and 1342 may be changed individually.

The image display apparatus 100 may receive weather information from an external device connected thereto either via a wired connection or wirelessly, and may change a screen or a 3D object displayed on the display unit 180 in accordance with the received weather information.

Figure 14:
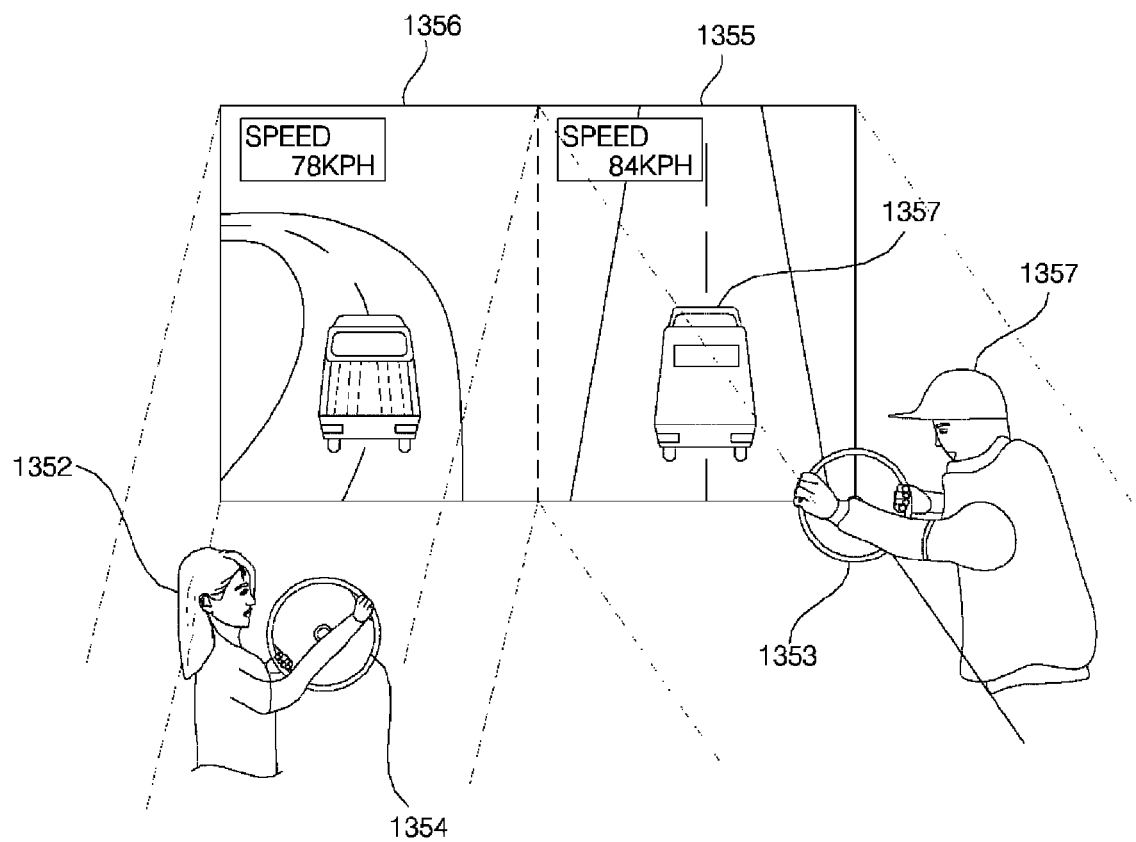

FIG. 14 illustrates a diagram for explaining an operating method of an image display apparatus according to a seventh exemplary embodiment of the present invention. In the seventh exemplary embodiment, the image display apparatus 100 may display a game content, and the control unit 170 may display a 3D object for inputting a command to the image display apparatus 100 in connection with the game content in front of each user.

Referring to FIG. 14, during the play of a car-racing game, the control unit 170 may determine the locations of first and second users 1351 and 1352 with the aid of the position or motion sensor of the sensor unit, and may determine the heights of the first and second users 1351 and 1352 and the heights of the hands of each of the first and second users 1351 and 1352.

Thereafter, the control unit 170 may display first and second 3D objects 1353 and 1354 in front of the first and second users 1351 and 1352, respectively, in consideration of the locations and heights of the first and second users 1351 and 1352 and the heights of the hands of each of the first and second users 1351 and 1352. More specifically, the control unit 170 may display the first 3D object 1353 in front of the first user 1351 at the same height as that of the hand of the first user 1351, and may display the second 3D object 1354 in front of the second user 1352 at the same height as that of the hand of the second user 1352.

The control unit 170 may detect hand gestures made by the first and second users 1351 and 1352 with the aid of the motion sensor of the sensor unit. The first and second 3D objects 1353 and 1354 may render an image of a steering wheel. The control unit 170 may control the image display apparatus 100 in accordance with the motion of the hands of the first and second users 1351 and 1352.

For example, if the gesture of holding a steering wheel is detected when the first or second 3D object 1353 or 1354 is displayed in front of the hands of the first or second user 1351 or 1352, the control unit 170 may determine that the first 3D object 1353 or 1354 has been held by the first or second user 1351 or 1352.

In addition, if the gesture of rotating a steering wheel is detected when the first or second 3D object 1353 or 1354 is displayed in front of the hands of the first or second user 1351 or 1352, the control unit 170 may determine that the first 3D object 1353 or 1354 has been rotated by the first or second user 1351.

That is, the control unit 170 may determine what parts of the first and second 3D objects 1353 and 1354 have been selected based on the heights of the hands of each of the first and second users 1351 and 1352 and the hand gestures made by the first and second users 1351 and 1352, and may change first and second screens 1355 and 1356 displayed on the display unit 180 according to the results of the determination.

The first screen 1355 may be changed in accordance with the heights of the hands of the first user 1351 and the hand gesture made by the first user 1351. More specifically, the control unit 170 may determine the heights of the hands of the first user 1351 and the hand gesture made by the first user 1351 with the aid of the position or motion sensor of the sensor unit, and may determine what part of the first 3D object 1353 has been selected based on the results of the determination. Thereafter, the control unit 170 may change the first screen 1355 in accordance with a command corresponding to the selected part of the first 3D object 1353.

If the first user 1351 simulates rotating a steering wheel clockwise when the first 3D object 1353 is displayed in front of the hands of the first user 1351, the control unit 170 may determine that the first 3D object 1353 has been rotated clockwise, and may change the direction of travel of a car 1357 in the first screen 1355 in accordance with the direction of the rotation of the first 3D object 1353.

In short, the control unit 170 may determine the heights of the hands of each of the first and second users 1351 and 1352 and/or the hand gestures made by the first and second users 1351 and 1352, may determine what parts of the first and second 3D objects 1353 and 1354 have been selected based on the results of the determination, and may change the state of display of the first and second screens 1355 and 1356 accordingly.

Figure 15:
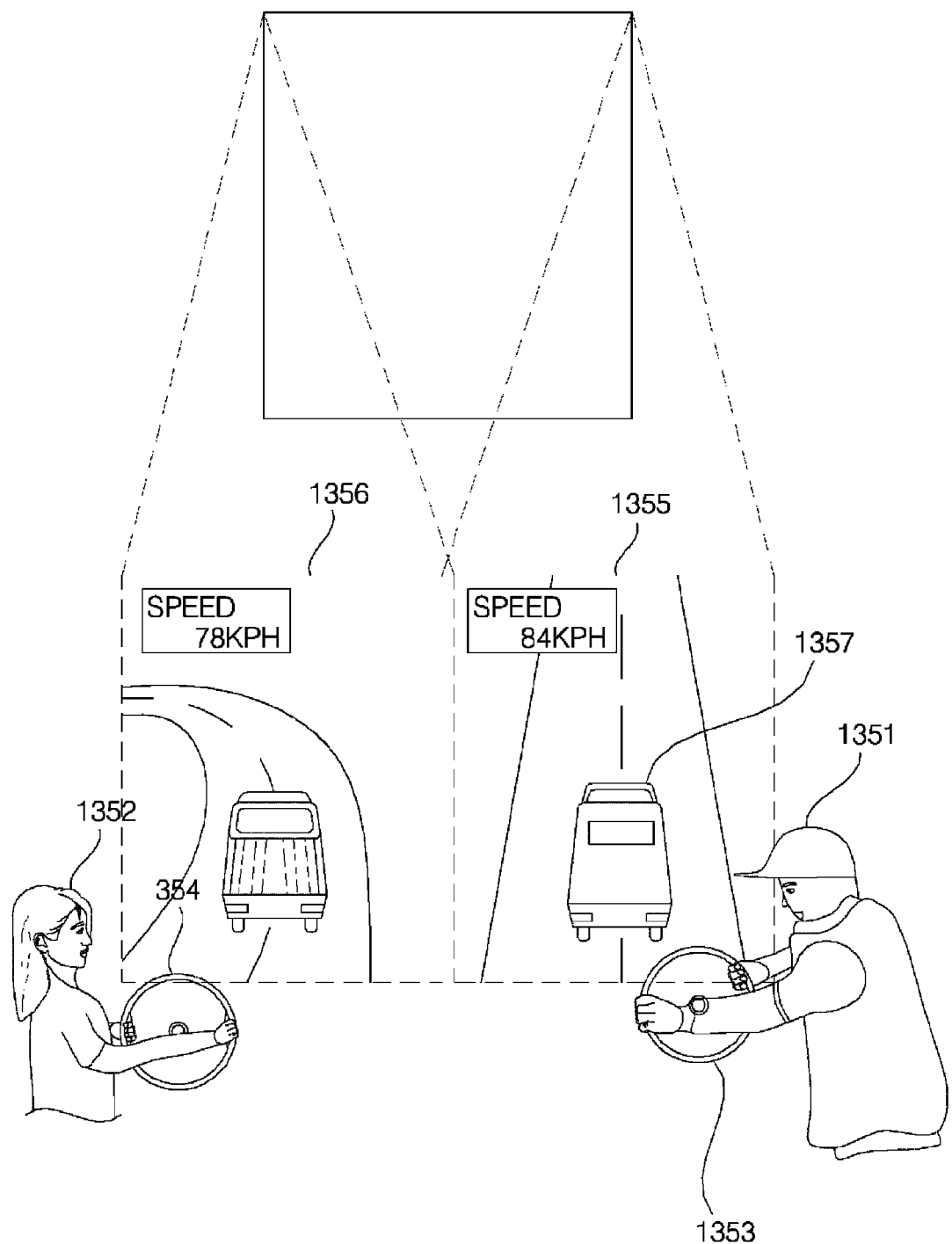

FIG. 15 illustrates a diagram for explaining a variation of the seventh exemplary embodiment. Referring to FIG. 15, the image display apparatus 100 may change the state of display of first and second main screen 1355 and 1356 respectively corresponding to the first and second users 1351 and 1352 in accordance with the hand gestures made by the first and second users 1351 and 1352.

The first user 1351 may view the first main screen 1355 from the image display apparatus 100, and the second user 1352 may view the main second screen 1356 from the image display apparatus 100. The first and second main screens 1355 and 1356 may be changed individually in accordance with how the first and second users 1351 and 1352 play the car-racing game.

Figure 16A:
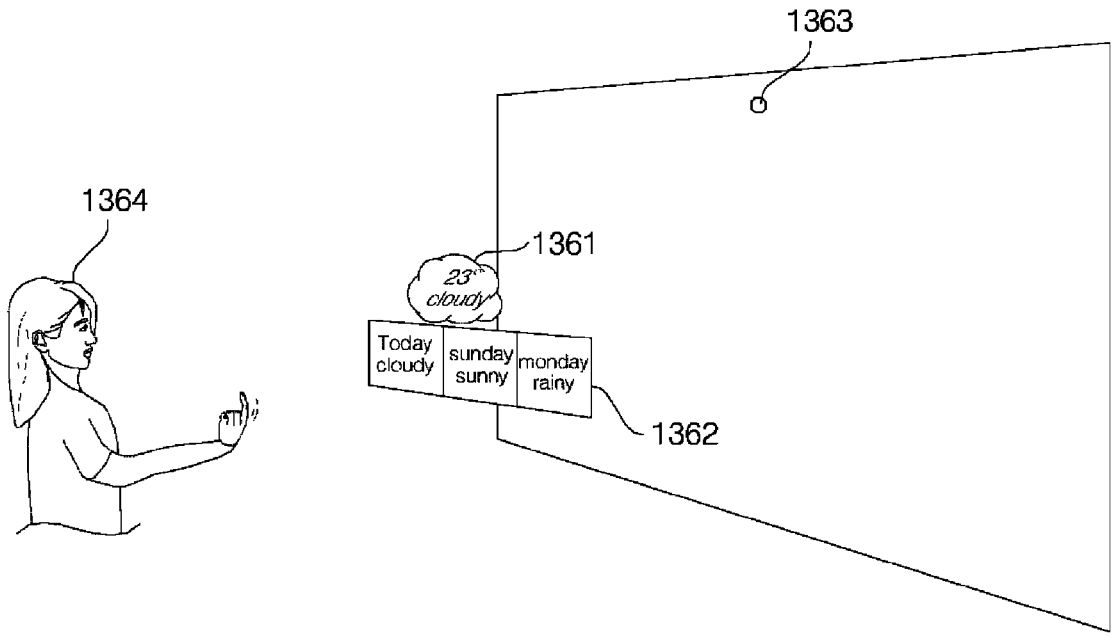
Figure 16B:
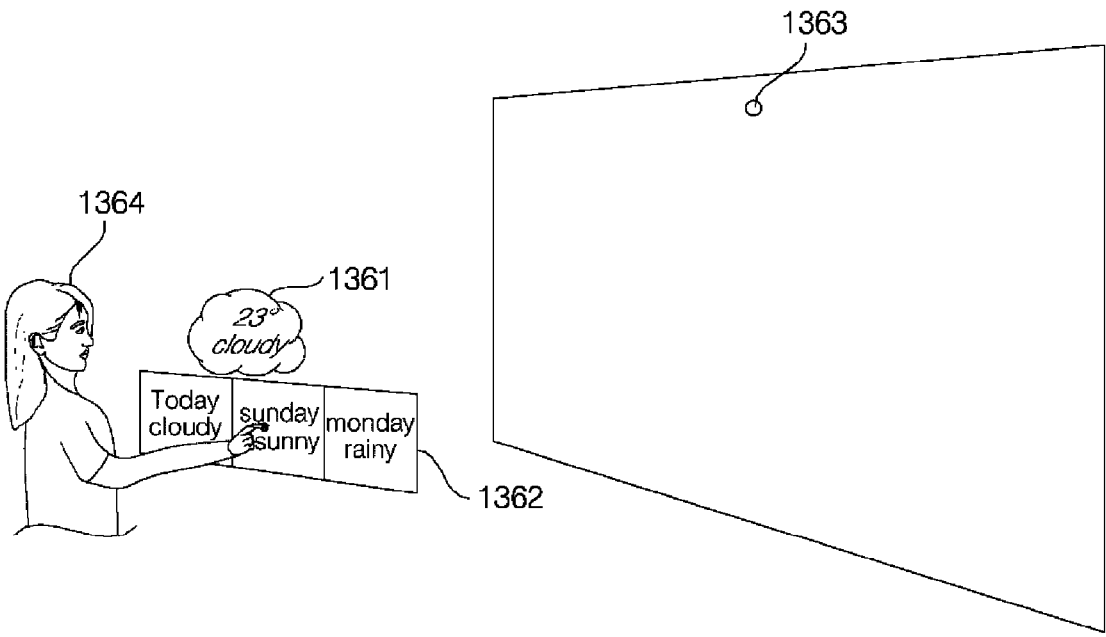

FIGS. 16A and 16B illustrate how to change the state of display of a 3D object in accordance with a hand gesture made by a user. Referring to FIG. 16A, the image display apparatus 100 may determine the location of a user 1364 using a camera 1363, and may display first and second 3D objects 1361 and 1362 so that the user 1364 can feel as if the first and second 3D objects 1362 and 1362 were located right in front of the user 1364.

The user 1364 may input a command to change the state of display of the first and second 3D objects 1361 and 1362 to the image display apparatus 100 by making a simple hand gesture. The camera 1363 may capture an image of the hand gesture made by the user 1364, and the control unit 170 may determine whether the hand gesture made by the user 1364 corresponds to a command to bring the first and second 3D objects 1361 and 1362 closer to the user 1364 based on the image captured by the camera 1363.

Then, if the hand gesture made by the user 1364 is determined to correspond to the command to bring the first and second 3D objects 1361 and 1362 closer to the user 1364, the image display apparatus 100 may perform image signal processing such that the 3D objects 1361 and 1362 can be displayed as if they were actually brought closer to the user 1364, as shown in FIG. 16B.

According to the present invention, it is possible to input various commands regarding the display of a 3D object to the image display apparatus 100 by making a simple hand gesture. In this case, the image display apparatus 100 may identify the hand gesture made by the user with the aid of the sensor unit and a sensing tool attached onto a certain part of the body of the user 1364. In addition, it is possible to input various commands regarding the display of a 3D object to the image display apparatus 100 using the remote control device 200.

The image display apparatus according to the present invention and the operating method of the image display apparatus according to the present invention are not restricted to the exemplary embodiments set forth herein. Therefore, variations and combinations of the exemplary embodiments set forth herein may fall within the scope of the present invention.

The present invention can be realized as code that can be read by a processor that can be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, and an optical data storage. The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

As described above, according to the present invention, it is possible to provide an image display apparatus capable of displaying a screen to which a stereoscopic effect is applied so as to provide a sense of three-dimensionality. The image display apparatus can determine the location of a user with the aid of a sensor and display a 3D object in consideration of the location of the user. Then, the user may be able to select the 3D object by making a simple hand gesture. If the 3D object is selected by the user, the image display apparatus may perform a operation corresponding to the 3D object. In this manner, it is possible for the user to effectively control the image display apparatus.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of displaying a three-dimensional (3D) object by an image display apparatus, the method comprising:
   determining, by the image display apparatus, whether a 3D object display event has occurred;
   detecting, by the image display apparatus, a location of an object outside of the image display apparatus when the 3D object display event has occurred;
   after detecting the location of the object, initially displaying, by the image display apparatus, the 3D object at a predetermined position outside of the image display apparatus relative to the detected location;

detecting a motion in or near the displayed 3D object; and changing the 3D object in response to the detected motion, wherein the predetermined position is at least one of a position directly in front of the detected location, a position to the left or right of the detected position, and a position above or below the detected position.

2. The method of claim 1, further comprising:

determining the predetermined position based on content of the 3D object.

3. The method of claim 1, wherein the 3D object includes one of a static image and a moving image.

4. The method of claim 1, wherein the step of detecting a location of an object includes detecting a first location of a first object and detecting a second location of a second object; and wherein the step of displaying the 3D object at a predetermined position includes displaying a first 3D object at a predetermined position relative to the first detected location and displaying a second object 3D object at a predetermined position relative to the second detected location.

5. The method of claim 1, wherein the step of detecting a location of an object outside of the image display apparatus comprises one of:

detecting an observer's height;

detecting an observer's eye level; and detecting an observer's hand level.

6. The method of claim 1, wherein the step of detecting a motion includes detecting the motion relative to one of plural subsections of the 3D object.

7. The method of claim 1, wherein the step of detecting a motion in or near the displayed 3D object comprises:

detecting a hand motion in or near the displayed 3D object; and identifying the hand motion by comparing the detected hand motion to a database of stored hand motions.

8. The method of claim 7, further comprising:

changing the predetermined position based on the identified hand motion.

9. An image display apparatus, comprising:

a tuner;

a display;

a detector; and a controller operatively connected to the tuner, the display and the detector, the controller configured to determine whether a 3D object display event has occurred;

detect a location of an object outside of the image display apparatus when the 3D object display event has occurred; and after detecting the location of the object, initially display a 3D object at a predetermined position outside of the image display apparatus relative to the detected location, wherein the predetermined position is at least one of a position directly in front of the detected location, a position to the left or right of the detected position, and a position above or below the detected position, wherein the controller is configured to detect a motion in or near the displayed 3D object, and wherein the controller is configured to change the 3D object in response to the detected motion.

10. The image display apparatus of claim 9, wherein the controller is configured to determine the predetermined position based on content of the 3D object.

11. The image display apparatus of claim 9, wherein the 3D object includes one of a static image and a moving image.

12. The image display apparatus of claim 9, wherein the controller is configured to:

detect a first location of a first object and detect a second location of a second object; and display a first 3D object at a predetermined position relative to the first detected location and display a second object 3D object at a predetermined position relative to the second detected location.

13. The image display apparatus of claim 9, wherein the controller is configured to detect one of:

an observer's height;

an observer's eye level; and an observer's hand level.

14. The image display apparatus of claim 9, wherein the controller is configured to detect the motion relative to one of plural subsections of the 3D object.

15. The image display apparatus of claim 9, wherein the controller is configured to:

detect a hand motion in or near the displayed 3D object; and identify the hand motion by comparing the detected hand motion to a database of stored hand motions.

16. The image display apparatus of claim 15, wherein the controller is configured to change the predetermined position based on the identified hand motion.

* * * * *